US011115124B1

(12) United States Patent
Hason

(10) Patent No.: US 11,115,124 B1
(45) Date of Patent: Sep. 7, 2021

(54) ADAPTIVE SCHEDULING FOR PERIODIC DATA TRAFFIC IN AN OPTICAL COMMUNICATIONS NETWORK FOR A WIRELESS COMMUNICATIONS SYSTEM (WCS)

(71) Applicant: Corning Research & Development Corporation, Corning, NY (US)

(72) Inventor: Baruh Hason, Tel Aviv (IL)

(73) Assignee: Corning Research & Development Corporation, Corning, NY (US)

(*) Notice: Subject to any disclaimer, the term of this patent is extended or adjusted under 35 U.S.C. 154(b) by 0 days.

(21) Appl. No.: 16/886,861

(22) Filed: May 29, 2020

(51) Int. Cl.
*H04B 10/27* (2013.01)
*H04B 10/114* (2013.01)

(52) U.S. Cl.
CPC .......... *H04B 10/27* (2013.01); *H04B 10/114* (2013.01)

(58) Field of Classification Search
CPC .... H04Q 2011/0064; H04Q 2011/0094; H04B 10/272
See application file for complete search history.

(56) References Cited

U.S. PATENT DOCUMENTS

| 2003/0179769 | A1* | 9/2003 | Shi ...................... H04J 3/1694 370/442 |
| 2009/0245781 | A1* | 10/2009 | Qi ...................... H04B 10/0779 398/1 |
| 2017/0005723 | A1* | 1/2017 | Prause ............ H04B 10/07955 |
| 2017/0170923 | A1* | 6/2017 | Yoshida ............. H04J 14/0272 |

FOREIGN PATENT DOCUMENTS

| JP | 2004-187302 A | 7/2004 |
| JP | 2010-219833 A | 9/2010 |
| JP | 5326700 B2 | 10/2013 |
| JP | 5436690 B2 | 3/2014 |

(Continued)

OTHER PUBLICATIONS

Recommendation ITU-T G.984.3, Gigabit-capable Passive Optical Networks (G-PON): Transmission convergence layer specification, International Telecommunication Union, Geneva, Switzerland, Mar. 2008. (Year: 2008).*

*Primary Examiner* — Nathan M Cors
(74) *Attorney, Agent, or Firm* — C. Keith Montgomery

(57) ABSTRACT

Adaptive scheduling for periodic data traffic in an optical communications network for a wireless communications system (WCS) is disclosed. Herein, an optical line terminator (OLT) in an optical communications network is configured to dynamically adjust a scheduled start time(s) of a scheduled period(s) in a periodic schedule to help reduce a schedule misalignment to below a predefined threshold. More specifically, the OLT is configured to determine the schedule misalignment. Accordingly, the OLT can adjust the respective scheduled start time(s) of the scheduled period(s) based on a temporal step determined based on the determined schedule misalignment to reduce the schedule misalignment to below the predefined threshold. By adapting the periodic schedule based on the determined schedule misalignment, it is possible to reduce scheduling delays for communicating the periodic data traffic, thus making it possible for the optical communications network to support a time-critical application for improved user experience.

26 Claims, 15 Drawing Sheets

(56) References Cited

FOREIGN PATENT DOCUMENTS

| KR | 10-0825763 B1 | 4/2008 |
|---|---|---|
| KR | 10-2011-0060310 A | 6/2011 |
| KR | 10-1310906 B1 | 9/2013 |
| KR | 10-1553002 B1 | 9/2015 |
| WO | 2012/046282 A1 | 4/2012 |

* cited by examiner

ADAPTIVE SCHEDULING FOR PERIODIC DATA TRAFFIC IN AN OPTICAL COMMUNICATIONS NETWORK FOR A WIRELESS COMMUNICATIONS SYSTEM (WCS)

BACKGROUND

The disclosure relates generally to an optical communications network provided in a wireless communications system (WCS), such as a distributed communications system (DCS), configured to support wavelength-based uplink random access.

Wireless customers are increasingly demanding wireless communications services, such as cellular communications services and Wireless Fidelity (Wi-Fi) services. Thus, small cells, and more recently Wi-Fi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of DCSs as WCSs, such as a small cell radio access network (RAN) or distributed antenna system (DAS). DCSs include a central unit or node that is configured to transmit or distribute communications signals to remote units typically over physical mediums, such as electrical conductors or optical fiber. The remote units are configured to receive and distribute such communications signals to client devices within the antenna range of the remote unit. DCSs can be particularly useful when deployed inside buildings or other indoor environments where the wireless communications devices may not otherwise be able to effectively receive RF signals from a source.

In this regard, FIG. 1 illustrates a WCS 100, such as a DCS, that is configured to distribute communications services to remote coverage areas 102(1)-102(N), where 'N' is the number of remote coverage areas. The WCS 100 in FIG. 1 is provided in the form of a wireless DCS, such as a DAS 104. The DAS 104 can be configured to support a variety of communications services that can include cellular communications services, wireless communications services, such as RF identification (RFID) tracking, Wi-Fi, local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on remote units 106(1)-106(N) connected to a central unit 108 (e.g., a head-end controller, a central unit, or a head-end unit). The central unit 108 may be communicatively coupled to a source transceiver 110, such as for example, a base transceiver station (BTS) or a baseband unit (BBU). In this regard, the central unit 108 receives downlink communications signals 112D from the source transceiver 110 to be distributed to the remote units 106(1)-106(N). The downlink communications signals 112D can include data communications signals and/or communication signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the remote units 106(1)-106(N).

With continuing reference to FIG. 1, the remote units 106(1)-106(N) are configured to receive the downlink communications signals 112D from the central unit 108 over the communications link 114. The downlink communications signals 112D are configured to be distributed to the respective remote coverage areas 102(1)-102(N) of the remote units 106(1)-106(N). The remote units 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. Each of the remote units 106(1)-106(N) may include an RF transmitter/receiver 116(1)-116(N) and a respective antenna 118(1)-118(N) operably connected to the RF transmitter/receiver 116(1)-116(N) to wirelessly distribute the communications services to user equipment (UE) 120 within the respective remote coverage areas 102(1)-102(N). The remote units 106(1)-106(N) are also configured to receive uplink communications signals 112U from the UE 120 in the respective remote coverage areas 102(1)-102(N) to be distributed to the source transceiver 110.

Because the remote units 106(1)-106(N) include components that require power to operate, such as the RF transmitters/receivers 116(1)-116(N) for example, it is necessary to provide power to the remote units 106(1)-106(N). In one example, each remote unit 106(1)-106(N) may receive power from a local power source. In another example, the remote units 106(1)-106(N) may be powered remotely from a remote power source(s). For example, the central unit 108 in the WCS 100 in FIG. 1 includes a power source 122 that is configured to remotely supply power over the communications links 114 to the remote units 106(1)-106(N). For example, the communications links 114 may be cable that includes electrical conductors for carrying current (e.g., direct current (DC)) to the remote units 106(1)-106(N).

If the WCS 100 is an optical fiber-based DCS, the central unit 108 can be coupled to the remote units 106(1)-106(N) via an optical communications network 124, such as a passive optical network (PON). In this regard, the communications links 114 may by a "hybrid" cable that includes optical fibers for carrying the downlink and uplink communications signals 112D, 112U and separate electrical conductors for carrying current to the remote units 106(1)-106(N).

No admission is made that any reference cited herein constitutes prior art. Applicant expressly reserves the right to challenge the accuracy and pertinency of any cited documents.

SUMMARY

Embodiments disclosed herein include adaptive scheduling for periodic data traffic in an optical communications network for a wireless communications system (WCS). In a non-limiting example, the optical communications network can be a passive optical network (PON). In a conventional PON, an optical line terminator (OLT) determines a periodic schedule for an optical network unit (ONU) to send periodic data traffic to the OLT. The periodic schedule includes a number of scheduled periods, each beginning at a different scheduled start time and lasting for an identical scheduled duration. However, a data packet in the periodic data traffic can arrive at the ONU ahead of the scheduled start time of a respective scheduled period to cause a schedule misalignment. As a result, each periodic data packet in the periodic data traffic may be delayed, thus making it difficult for the optical communications network to satisfy a tight delay budget required by some time-critical applications.

In this regard, in embodiments disclosed herein, the OLT in an optical communications network is configured to dynamically adjust a scheduled start time(s) of a scheduled period(s) in a periodic schedule to help reduce the schedule misalignment to below a predefined threshold. More specifically, the OLT is configured to determine the schedule misalignment (e.g., via internal or external means). Accordingly, the OLT can determine a temporal step for adjusting the respective scheduled start time(s) of the scheduled period(s) to reduce the schedule misalignment to below the predefined threshold. By adapting the periodic schedule based on the determined schedule misalignment, it is possible to reduce scheduling delays for communicating the periodic data traffic, thus making it possible for the optical communications network to support a time-critical application for improved user experience.

One exemplary embodiment of the disclosure relates to an optical communications network. The optical communications network includes a plurality of ONUs each configured to communicate the periodic data traffic in a plurality of scheduled periods. Each of the plurality of scheduled periods begins at a scheduled start time that is different among the plurality of scheduled periods and lasts for a scheduled duration that is identical among the plurality of scheduled periods. The optical communications network also includes an OLT. The OLT includes a control circuit. The control circuit is configured to determine that a schedule misalignment exists in a selected scheduled period among the plurality of scheduled periods associated with any of the plurality of ONUs. The control circuit is also configured to determine a temporal step based on the determined schedule misalignment. The control circuit is also configured to adjust the scheduled start time of one or more of the plurality of scheduled periods succeeding the selected scheduled period based on the temporal step to reduce the schedule misalignment to below a predefined threshold. The OLT also includes an OLT interface coupled to the plurality of ONUs and configured to provide the adjusted scheduled start time to the any of the plurality of ONUs.

An additional exemplary embodiment of the disclosure relates to a method for supporting adaptive scheduling for periodic data traffic in an optical communications network for a WCS. The method includes communicating periodic data traffic in a plurality of scheduled periods. Each of the plurality of scheduled periods begins at a scheduled start time that is different among the plurality of scheduled periods and lasts for a scheduled duration that is identical among the plurality of scheduled periods. The method also includes determining that a schedule misalignment exists in a selected scheduled period among the plurality of scheduled periods. The method also includes determining a temporal step based on the determined schedule misalignment. The method also includes adjusting the scheduled start time of one or more of the plurality of scheduled periods succeeding the selected scheduled period based on the temporal step to reduce the schedule misalignment to below a predefined threshold.

An additional exemplary embodiment of the disclosure relates to a WCS. The WCS includes an optical communications network. The optical communications network includes a plurality of ONUs each configured to communicate periodic data traffic in a plurality of scheduled periods. Each of the plurality of scheduled periods begins at a scheduled start time that is different among the plurality of scheduled periods and lasts for a scheduled duration that is identical among the plurality of scheduled periods. The optical communications network also includes an OLT. The OLT includes a control circuit. The control circuit is configured to determine that a schedule misalignment exists in a selected scheduled period among the plurality of scheduled periods associated with any of the plurality of ONUs. The control circuit is also configured to determine a temporal step based on the determined schedule misalignment. The control circuit is also configured to adjust the scheduled start time of one or more of the plurality of scheduled periods succeeding the selected scheduled period based on the temporal step to reduce the schedule misalignment to below a predefined threshold. The OLT also includes an OLT interface coupled to the plurality of ONUs and configured to provide the adjusted scheduled start time to the any of the plurality of ONUs.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include adaptive scheduling for periodic data traffic in an optical communications network for a wireless communications system (WCS). In a non-limiting example, the optical communications network can be a passive optical network (PON). In a conventional PON, an optical line terminator (OLT) determines a periodic schedule for an optical network unit (ONU) to send the periodic data traffic to the OLT. The periodic schedule includes a number of scheduled periods, each beginning at a different scheduled start time and lasting for an identical scheduled duration. However, a data packet in the periodic data traffic can arrive at the ONU ahead of the scheduled start time of a respective scheduled period to cause a schedule misalignment. As a result, each periodic data packet in the periodic data traffic may be delayed, thus making it difficult for the optical communications network to satisfy a tight delay budget required by some time-critical applications.

In this regard, in embodiments disclosed herein, the OLT in an optical communications network is configured to dynamically adjust a scheduled start time(s) of a scheduled period(s) in a periodic schedule to help reduce the schedule misalignment to below a predefined threshold. More specifically, the OLT is configured to determine the schedule misalignment (e.g., via internal or external means). Accordingly, the OLT can determine a temporal step for adjusting the respective scheduled start time(s) of the scheduled period(s) to reduce the schedule misalignment to below the predefined threshold. By adapting the periodic schedule based on the determined schedule misalignment, it is possible to reduce scheduling delay for communicating the periodic data traffic, thus making it possible for the optical communications network to support a time-critical application for improved user experience.

Figure 1:
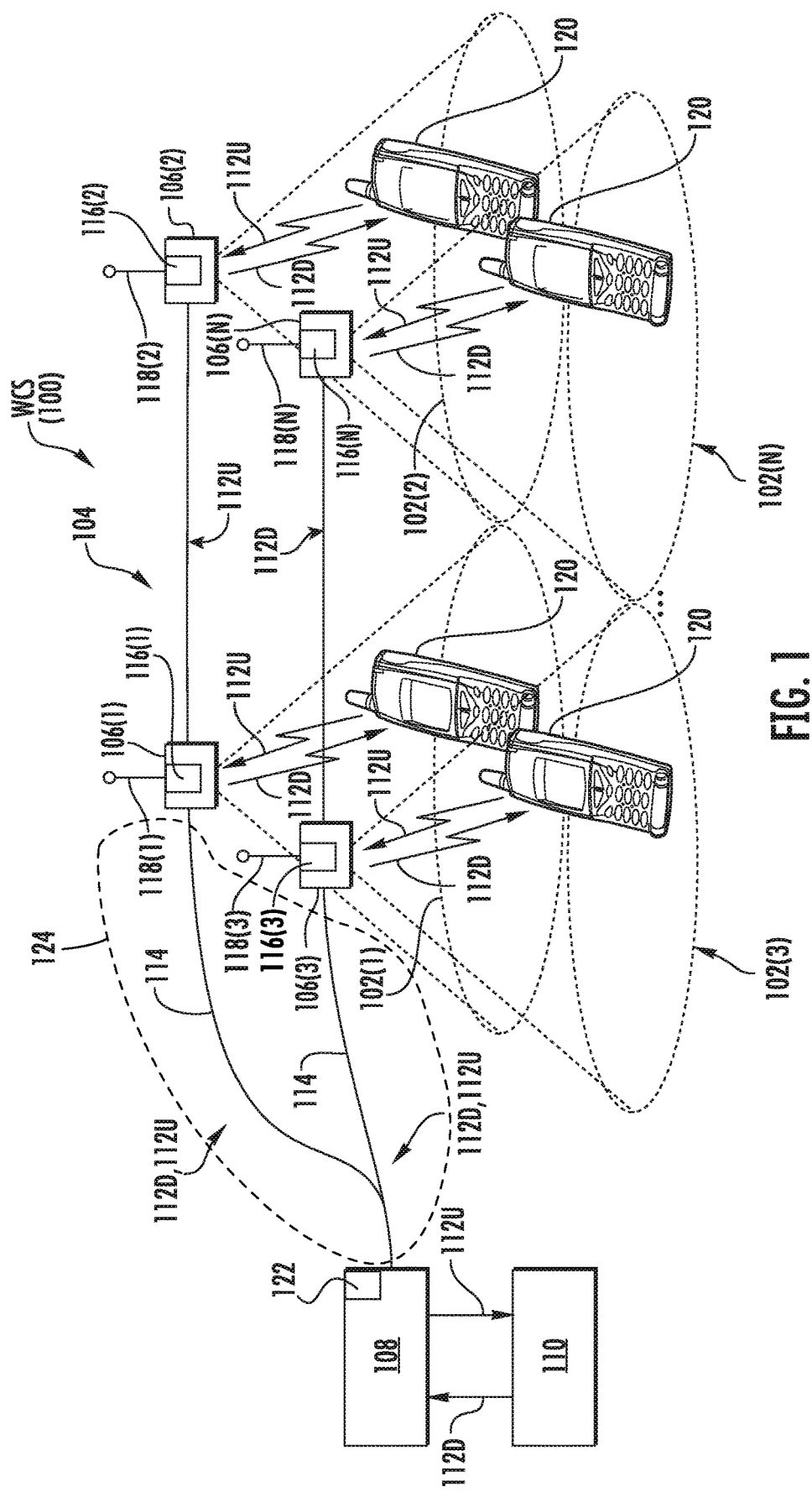
FIG. 1 is a schematic diagram of an exemplary wireless communications system (WCS), such as a distributed communications system (DCS), configured to distribute communications services to remote coverage areas.
Figure 2A:
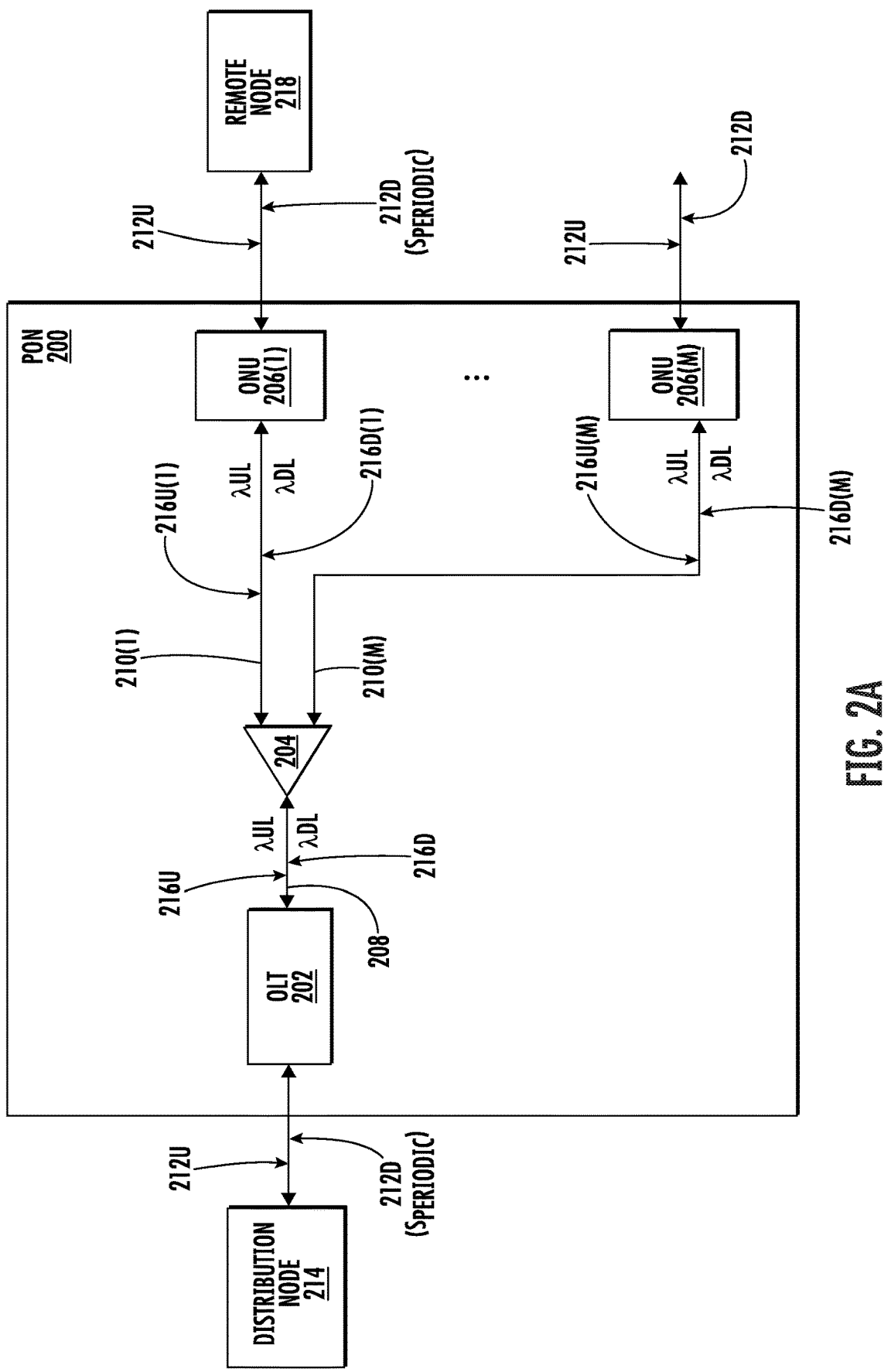
FIG. 2A is a schematic diagram of a conventional passive optical network (PON) configured to perform a conventional scheduling for periodic data traffic.
Figure 2B:
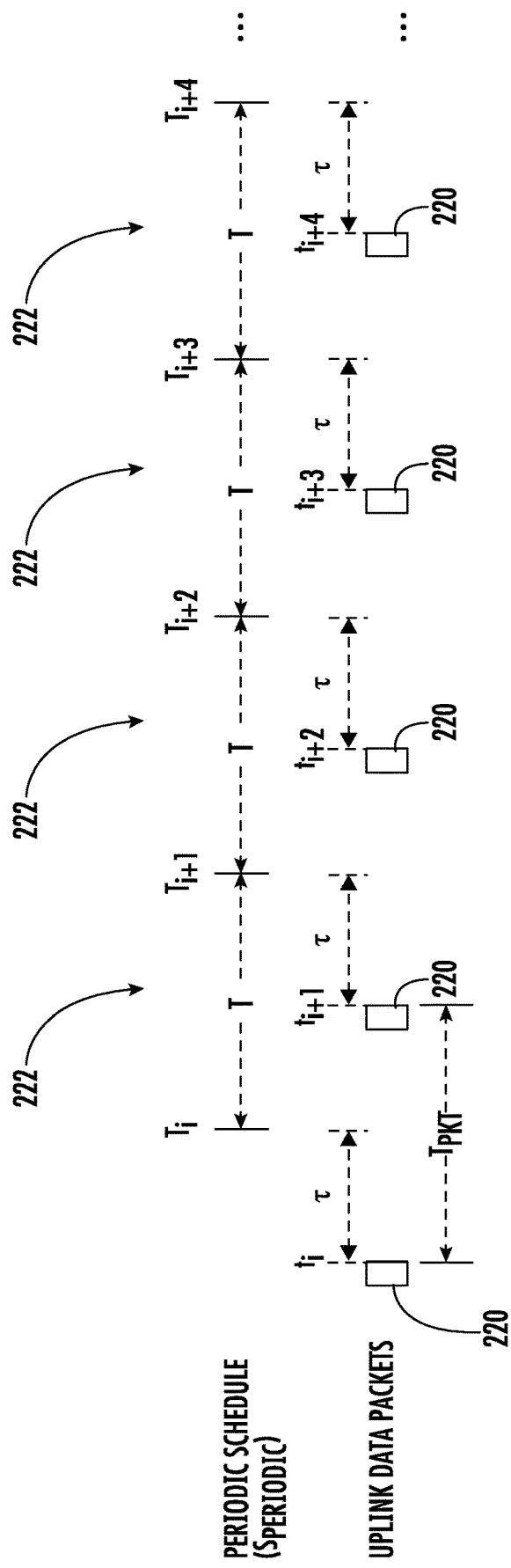
FIG. 2B is a schematic diagram providing an exemplary illustration of a schedule misalignment issue associated with the conventional scheduling for the periodic data traffic in the conventional PON of FIG. 2A.
Figure 3:
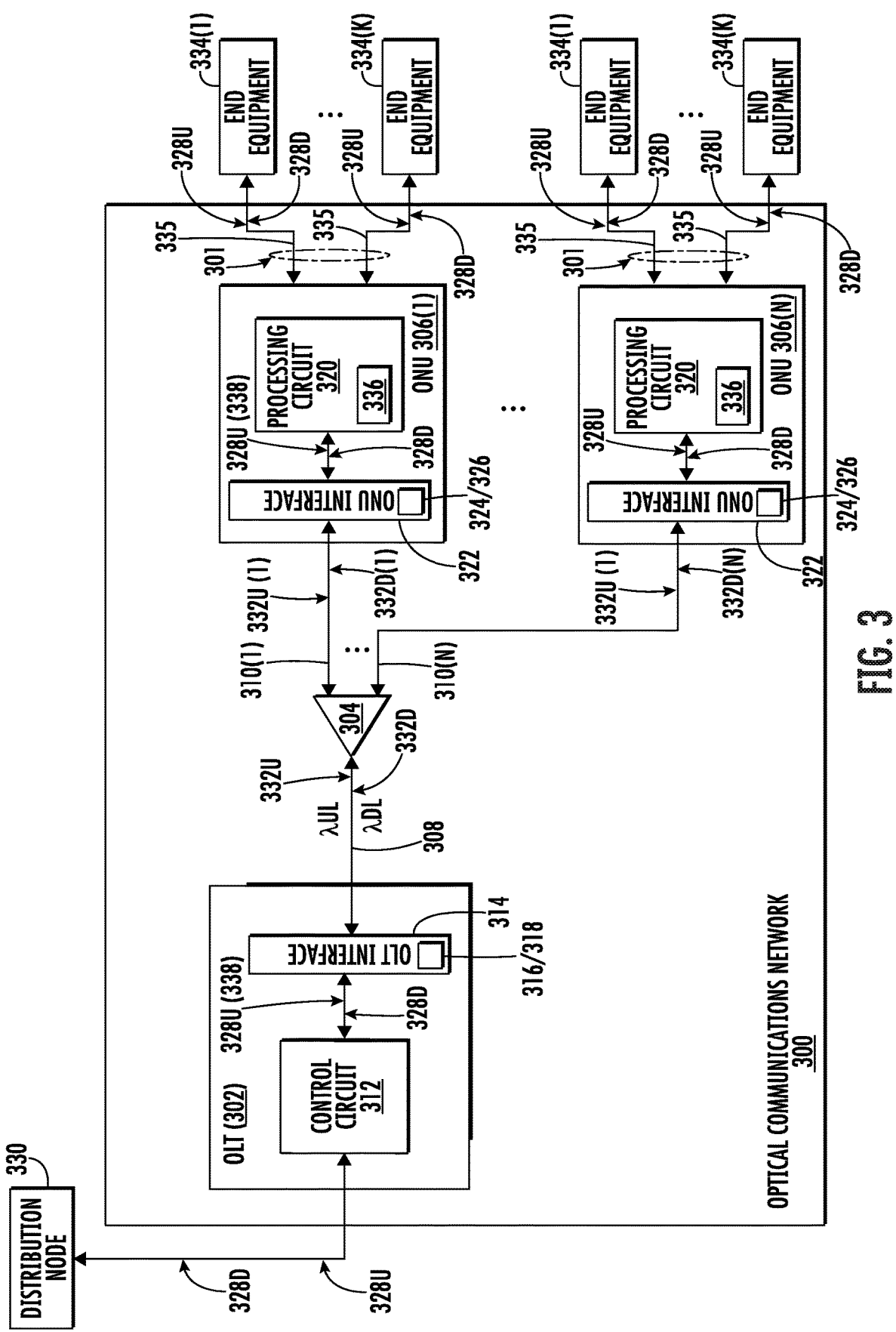
FIG. 3 is a schematic diagram of an optical communications network configured to support adaptive scheduling for the periodic data traffic.

Before discussing an optical communications network in a WCS that supports adaptive periodic scheduling of the present disclosure, starting at FIG. 3, a brief discussion of conventional periodic scheduling in a conventional passive optical network (PON) is first provided with references to FIGS. 2A and 2B.

In this regard, FIG. 2A is a schematic diagram of a conventional PON 200 configured to perform a conventional scheduling for periodic data traffic. The conventional PON 200 includes an OLT 202, a passive optical splitter 204, and a plurality of ONUs 206(1)-206(M). Notably, in the conventional PON 200, the OLT 202 is an optical-electrical equipment typically placed in a central office to bridge communications between a service provider(s) and the conventional PON 200. Specifically, the OLT 202 can include control and switch module (CSM), link module, redundancy protection module, power supply module, and so on. Each of the ONUs 206(1)-206(M) can be an optical-electrical equipment typically provided in an end user premise(s) to connect a subscriber(s) to the conventional PON 200, and thus to the service provider(s). The passive optical splitter 204, on the other hand, is an optical unit that bridges the OLT 202 to the ONUs 206(1)-206(M) via a branching tree of optical fibers. The OLT 202 is coupled to the passive optical splitter 204 via a first optical fiber-based communications medium 208. The passive optical splitter 204 is coupled to the ONUs 206(1)-206(M) via a plurality of second optical fiber-based communications mediums 210(1)-210(M).

The conventional PON 200 is said to be passive because the passive optical splitter 204 operates entirely in an optical domain (as opposed to operating in an electrical domain or a digital domain) without requiring a power supply. The conventional PON 200 can be configured to support a Gigabit PON (GPON) standard or an Ethernet PON (EPON) standard. Both the GPON and the EPON standards define a similar OLT-ONU topology as shown in the conventional PON 200.

In downlink, the OLT 202 receives a downlink communications signal 212D from a distribution node 214. The OLT 202 can include an electrical-to-optical (E/O) converter(s) (not shown) to convert the downlink communications signal 212D into a downlink optical communications signal 216D. The OLT 202 communicates the downlink optical communications signal 216D to the passive optical splitter 204 based on a downlink wavelength $\lambda_{DL}$. The passive optical splitter 204 splits the downlink optical communications signal 216D into a plurality of downlink optical communications signals 216D(1)-216D(M). Each of the downlink optical communications signals 216D(1)-216D(M) is a replica of the downlink optical communications signal 216D and corresponds to the downlink wavelength $\lambda_{DL}$. The ONUs 206(1)-206(M) receive the downlink optical communications signals 216D(1)-216D(M) based on the downlink wavelength $\lambda_{DL}$ over the second optical fiber-based communications mediums 210(1)-210(M). Each of the ONUs 206(1)-206(M) can include an optical-to-electrical (O/E) converter(s) (not shown) to convert a respective one of the downlink optical communications signals 216D (1)-216D(M) to the downlink communications signal 212D. Each of the ONUs 206(1)-206(M) may be coupled to at least one remote node 218. Accordingly, each of the ONUs 206(1)-206(M) may provide the downlink communications signal 212D to the remote node 218.

In uplink, each of the ONUs 206(1)-206(M) can receive an uplink communications signal 212U from the remote node 218. The ONUs 206(1)-206(M) can include an E/O converter(s) (not shown) to convert the uplink communications signal 212U into a plurality of uplink optical communications signals 216U(1)-216U(M). The ONUs 206(1)-206(M) provide the uplink optical communications signals 216U(1)-216U(M) to the passive optical splitter 204 based on an uplink wavelength $\lambda_{UL}$ over the second optical fiber-based communications mediums 210(1)-210(M). The passive optical splitter 204 combines the uplink optical communications signals 216U(1)-216U(M) into an uplink optical communications signal 216U. The OLT 202 receives the uplink optical communications signal 216U based on the uplink wavelength $\lambda_{UL}$ over the first optical fiber-based communications medium 208. The OLT 202 can include an O/E converter(s) to convert the uplink optical communications signal 216U to the uplink communications signal 212U. The OLT 202 then provides the uplink communications signal 212U to the distribution node 214.

Each of the ONUs 206(1)-206(M) can receive the uplink communications signal 212U as periodic data traffic. Herein, the periodic data traffic is a stream of data packets separated by a fixed interval. In the conventional PON 200, each of the ONUs 206(1)-206(M) receives a periodic schedule $S_{Periodic}$ from the OLT 202 for communicating the stream of data packets of the periodic data traffic. In this regard, FIG. 2B is a schematic diagram providing an exemplary illustration of a schedule misalignment issue associated with the conventional scheduling for the periodic data traffic in the conventional PON 200 of FIG. 2A.

With reference to FIG. 2B, the uplink communications signal 212U in FIG. 2A includes a plurality of data packets 220 each separated by a fixed interval $T_{PKT}$. Each of the ONUs 206(1)-206(M) can be configured to queue the data packets 220 in a data buffer (not shown), such as a first-in first-out (FIFO) queue, before communicating the data packets 220 based on the periodic schedule $S_{Periodic}$. Accordingly, a first of the data packets 220 is enqueued in the data buffer at time $t_i$, a second of the data packets 220 is enqueued in the data buffer at time $t_{i+1}$ ($t_{i+1}=t_i+T_{PKT}$), a third of the data packets 220 is enqueued in the data buffer at time $t_{i+2}$ ($t_{i+2}=t_{i+1}+T_{PKT}$), and so on. In this regard, the first of the data packets 220 is ready to be communicated to the OLT 202 at time $t_i$, the second of the data packets 220 is ready to be communicated to the OLT 202 at time $t_{i+1}$, the third of the data packets 220 is ready to be communicated to the OLT 202 at time $t_{i+2}$, and so on.

The periodic schedule $S_{Periodic}$ provided by the OLT 202 includes a plurality of scheduled periods 222. Each of the scheduled periods 222 begins at a scheduled start time $T_{i+x}$ (x≥0) and last for a scheduled duration T (e.g., $T=T_{PKT}$). Accordingly, a first of the scheduled periods 222 begins at time $T_i$ and lasts for the scheduled duration T, a second of the scheduled periods 222 begins at time $T_{i+1}$ ($T_{i+1}=T_i+T$) and lasts for the scheduled duration T, a third of the scheduled periods 222 begins at time $T_{i+2}$ ($T_{i+2}=T_{i+1}+T$) and lasts for the scheduled duration T, and so on. In this regard, the scheduled start time $T_{i+x}$ is different across the scheduled periods 222, while the scheduled duration T is identical among all the scheduled periods 222.

In an example discussed herein, the first of the scheduled periods 222 corresponds to the first of the data packets 220, the second of the scheduled periods 222 corresponds to the second of the data packets 220, the third of the scheduled periods 222 corresponds to the third of the data packets 220, and so on. Taking the first of the data packets 220 as an example, the first of the data packets 220 is ready for communication at time $t_i$. However, the scheduled start time $T_i$ of the first of the scheduled periods 222 lags behind the time $t_i$, at which the first of the data packets 220 is enqueued in the data buffer, by a temporal difference τ ($\tau=t_i-T_i$). As a result, the first of the data packets 220 stays in the data buffer awaiting the scheduled start time $T_i$ of the first of the scheduled periods 222. Hereinafter, the temporal difference τ between a time at which any of the data packets 220 is enqueued in the data buffer and a scheduled start time $T_{i+x}$ (x≥0) of a respective one of the scheduled periods 222 is referred to as a schedule misalignment τ. In some cases, the schedule misalignment τ can be up to a duration of the scheduled duration T.

In some cases, the data packets 220 may be associated with a time-critical application(s) having a tight delay budget. For example, to support a time-critical application, such as communicating the data packets 220 based on an enhanced common public radio interface (eCPRI) protocol, the conventional PON 200 needs to satisfy a delay budget that is less than a maximum one-way frame delay. If the conventional PON 200 of FIG. 2A is configured based on a split 7.2 configuration, wherein a medium access control (MAC) layer of the conventional PON 200 resides in the distribution node 214 and a physical (PHY) layer of the conventional PON 200 resides in the remote node 218, the allowed maximum one-way packet delay is approximately one hundred microseconds (100 μs). As such, it may be desired to reduce the schedule misalignment τ to below a predefined threshold (e.g., <20 μs).

In this regard, FIG. 3 is a schematic diagram of an optical communications network 300 configured to support adaptive scheduling for periodic data traffic 301. The optical communications network 300 includes an OLT 302, a passive optical splitter 304, and a plurality of ONUs 306(1)-306(N). The OLT 302 is coupled to the passive optical splitter 304 via a first optical fiber-based communications medium 308. The passive optical splitter 304 is coupled to the ONUs 306(1)-306(N) via a plurality of second optical fiber-based communications mediums 310(1)-310(N), respectively. In a non-limiting example, the optical communications network 300 can be a PON configured to operate based on any established PON standard and/or architecture, including but not limited to gigabit PON (GPON), Ethernet PON (EPON), XG-PON, XGS-PON, NG-PON, and 10G-EPON. In this regard, the passive optical splitter 304 operates entirely in an optical domain (as opposed to operating in an electrical domain or a digital domain) and does not require a power supply.

As discussed in detail below, the optical communications network 300 is configured to reduce the schedule misalignment τ in the conventional PON 200 of FIG. 2A for communicating the periodic data traffic 301 from any of the ONUs 306(1)-306(N) to the OLT 302. More specifically, the OLT 302 can dynamically adjust a scheduled start time(s) (e.g., $T_i$, $T_{i+1}$, $T_{i+2}$, and so on in FIG. 2B) of a scheduled period(s) (e.g., scheduled periods 222 in FIG. 2B) in a periodic schedule $S_{Periodic}$ to help reduce the schedule misalignment τ to below a predefined threshold (e.g., <20 μs). More specifically, the OLT 302 can determine the schedule misalignment τ, either by receiving an indication from any one of the ONUs 306(1)-306(N) or by an internal estimate performed at the OLT 302. Accordingly, the OLT 302 can determine a temporal step Δt based on the determined schedule misalignment τ and use the determined temporal step Δt to adjust (e.g., bring forward) the scheduled start time(s) of the scheduled period(s) to help reduce the schedule misalignment τ to below the predefined threshold. By adapting the periodic schedule $S_{Periodic}$ based on the determined schedule misalignment τ, it is possible to reduce scheduling delays for communicating the periodic data traffic 301, thus making it possible for the optical communications network 300 to satisfy the tight delay budget associated with the time-critical communication(s) for improved user experience.

Figure 4:
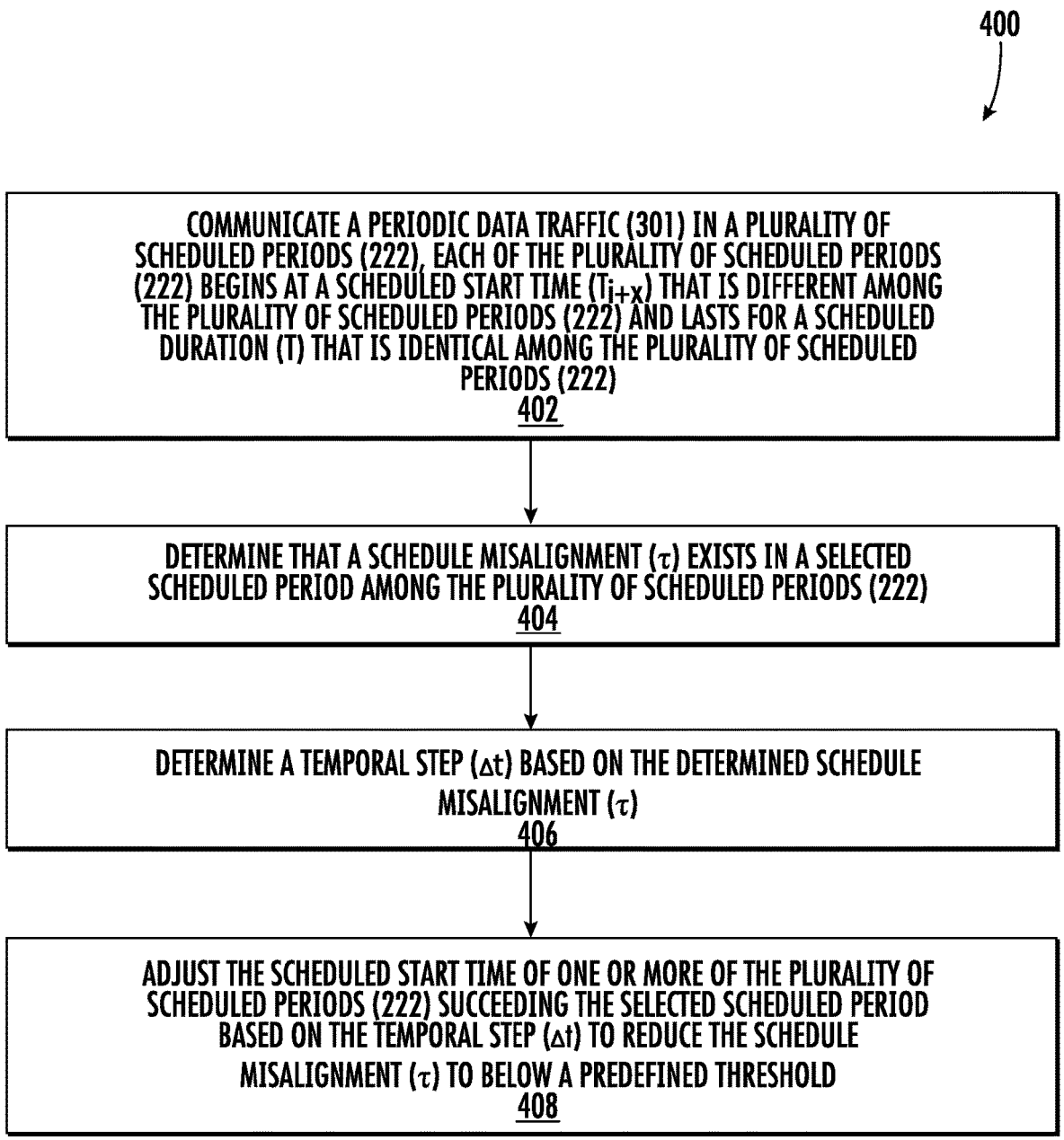
FIG. 4 is a flowchart of an exemplary process that can be employed by the optical communications network of FIG. 3 to support adaptive scheduling for the periodic data; traffic.

The optical communications network 300 can be configured to support adaptive scheduling for the periodic data traffic 301 based on a process. In this regard, FIG. 4 is a flowchart of an exemplary process 400 that can be employed by the optical communications network 300 of FIG. 3 to support adaptive scheduling for the periodic data traffic 301.

In the optical communications network 300, each of the ONUs 306(1)-306(N) can communicate the periodic data traffic 301 in the scheduled periods 222 in FIG. 2B (block 402). As previously discussed, each of the scheduled periods 222 begins at the scheduled start time $T_{i+x}$ (x≥0), which is different across the scheduled periods 222, and lasts for the scheduled duration T that is identical among the scheduled periods 222. The OLT 302 determines that the schedule misalignment τ exists in a selected scheduled period among the scheduled periods 222 (block 404). Notably, the selected scheduled period can be any of the scheduled periods 222. The OLT 302 then determines the temporal step Δt based on the determined schedule misalignment τ (block 406). In a non-limiting example, the determined temporal step Δt is smaller than the scheduled duration T. Accordingly, the OLT 302 adjusts the scheduled start time of one or more of the scheduled periods 222 succeeding the selected scheduled period based on the temporal step Δt to reduce the schedule misalignment τ to below the predefined threshold (block 408).

With reference back to FIG. 3, the OLT 302 can include a control circuit 312, which can be a field-programmable gate array (FPGA), a system on chip (SoC), or a microprocessor, as an example. The OLT 302 also includes an OLT interface 314 coupled to the first optical fiber-based communications medium 308. The OLT interface 314 includes at least one electrical-to-optical (E/O) converter 316 and at least one optical-to-electrical (O/E) converter 318.

Each of the ONUs 306(1)-306(N) includes a processing circuit 320, which can be an FPGA, an SoC, or a microprocessor, as an example. Each of the ONUs 306(1)-306(N) also includes an ONU interface 322 coupled to a respective one of the second optical fiber-based communications mediums 310(1)-310(N). The ONU interface 322 includes at least one E/O converter 324 and at least one O/E converter 326.

The OLT 302 is configured to receive a downlink communications signal 328D from a distribution node 330 and provides an uplink communications signal 328U to the distribution node 330. In a non-limiting example, the OLT 302 can communicate the downlink communications signal 328D and the uplink communications signal 328U as digital communications signals based on the eCPRI protocol. The control circuit 312 may process the downlink communications signal 328D (e.g., protocol conversion, packet filtering, packet reconstruction, packet aggregation, etc.) to make the downlink communications signal 328D suitable for communicating in the optical communications network 300. In addition, the control circuit 312 can piggy-back the periodic schedule $S_{Periodic}$ onto the downlink communications signal 328D.

The E/O converter 316 in the OLT interface 314 converts the downlink communications signal 328D into a downlink optical communications signal 332D. The downlink optical communications signal 332D is provided to the passive optical splitter 304 over the first optical fiber-based communications medium 308 and based on a downlink wavelength $\lambda_{DL}$. The passive optical splitter 304 splits the downlink optical communications signal 332D into a plurality of downlink optical communications signals 332D(1)-332D(N). Each of the downlink optical communications signals 332D(1)-332D(N) is a replica of the downlink optical communications signal 332D. The ONU interface 322 in each of the ONUs 306(1)-306(N) receives a respective one of the downlink optical communications signals 322D(1)-322D(N) over a respective one of the second optical fiber-based communications mediums 310(1)-310(N). The O/E converter 326 in the ONU interface 322 converts the respective one of the downlink optical communications signals 332D(1)-332D(N) into the downlink communications signal 328D for distribution to one or more end equipment 334(1)-334(K). Herein, each of the end equipment 334(1)-334(K) can be an electronic device having an interface(s) and/or a processing circuit(s) for communicating periodic and/or non-periodic traffic with the distribution node 330. In a non-limiting example, the end equipment 334(1)-334(K) can be any one of or any combination of remote units, remote radio heads, Wi-Fi access points, femtocell base stations, network switches/routers, and so on. Each of the end equipment 334(1)-334(K) can be coupled to a respective one of the ONUs 306(1)-306(N) via an electrical cable 335 (e.g., a coaxial cable, a twisted-wire cable, etc.)

Each of the ONUs 306(1)-306(N) receives the uplink communications signal 328U from a respective one of the end equipment 334(1)-334(K). The uplink communications signal 328U includes the periodic data traffic 301, such as constant bit rate (CBR) data traffic. Understandably, the uplink communications signal 328U can also include non-periodic data traffic, such as variable bit rate (VBR) video data traffic and/or bursty best-effort (BE) data traffic. The processing circuit 320 in each of the ONUs 306(1)-306(N) can include a data buffer 336 configured to operate as a FIFO queue. In this regard, the processing circuit 320 enqueues each data packet associated with the periodic data traffic 301 in the data buffer 336 before sending the data packet to the ONU interface 322.

The E/O converter 324 in the ONU interface 322 of each of the ONUs 306(1)-306(N) converts the uplink communications signal 328U into a respective one of a plurality of uplink optical communications signals 332U(1)-332U(N). The uplink optical communications signal 332U(1)-332U(N) are provided to the passive optical splitter 304 over the second optical fiber-based communications mediums 310(1)-310(N) and based on an uplink wavelength $\lambda_{UL}$. The passive optical splitter 304 combines the uplink optical communications signal 332U(1)-332U(N) into the uplink optical communications signal 332U. The OLT interface 314 receives the uplink optical communications signal 332U via the first optical fiber-based communications medium 308 and based on the uplink wavelength $\lambda_{UL}$. The O/E converter 318 in the OLT interface 314 converts the uplink optical communications signal 332U into the uplink communications signal 328U. Accordingly, the OLT 302 provides the uplink communications signal 328U to the distribution node 330.

In a non-limiting example, the optical communications network 300 can be a PON, such as a GPON or an EPON. In this regard, like the OLT 202 in the conventional PON of FIG. 2A, the OLT 302 needs to determine the periodic schedule $S_{Periodic}$ including the scheduled periods 222 for any of the ONUs 306(1)-306(N) to communicate the periodic data traffic 301 via a respective one of the plurality of uplink optical communications signals 332U(1)-332U(N). As previously described in FIG. 2B, each of the scheduled periods 222 starts at the scheduled start time $T_{i+x}$ ($x \geq 0$), which is different across the scheduled periods 222, and lasts for the scheduled duration T that is identical among the scheduled periods 222. The OLT 302 may determine the periodic schedule $S_{Periodic}$ based on any known scheduling methods.

As illustrated in FIG. 2B, the schedule misalignment τ can exist in each of the scheduled periods 222. In contrast to the conventional PON 200 of FIG. 2A, which is unable to reduce the schedule misalignment τ, the optical communications network 300 can dynamically and adaptively reduce the schedule misalignment τ based on a number of different approaches, which will be discussed in detail below.

Figure 5A:
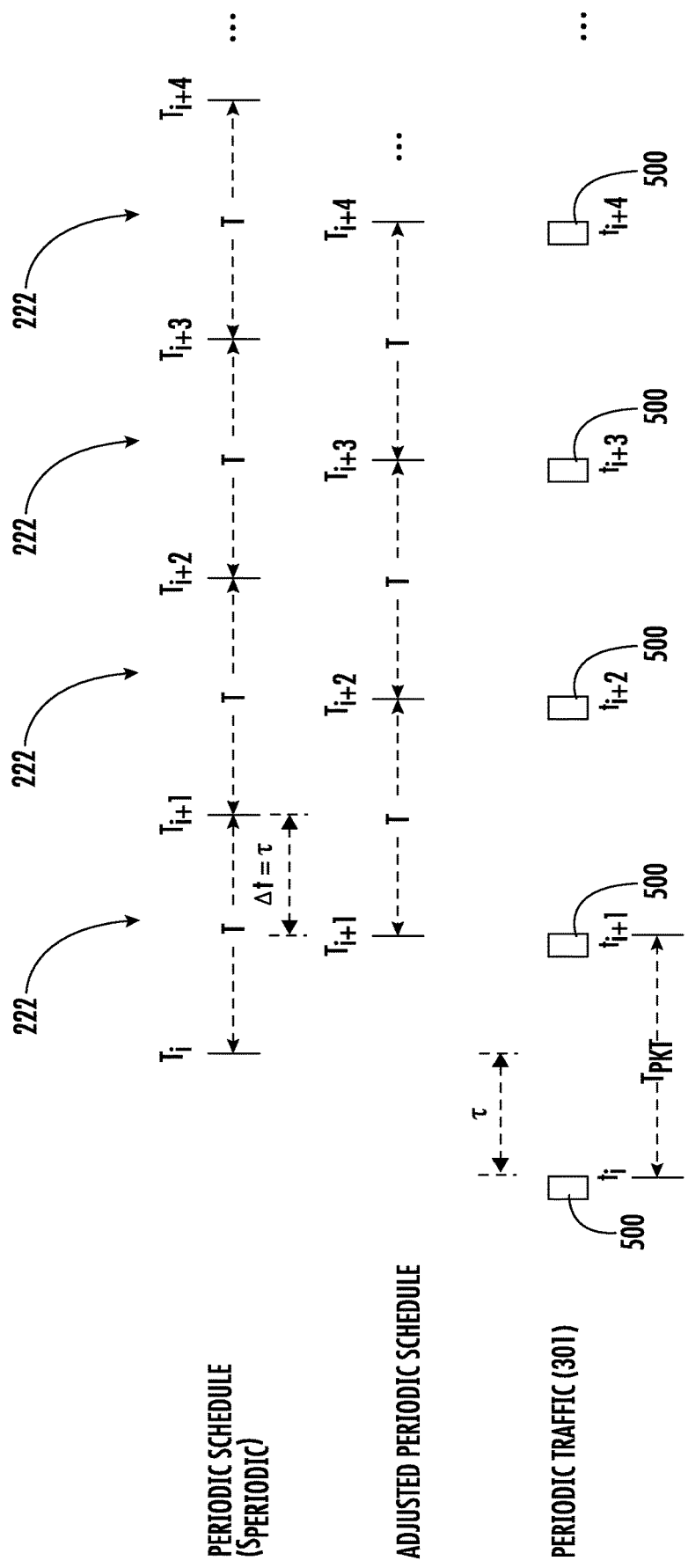
FIG. 5A is a schematic diagram providing an exemplary illustration of an optical line terminator (OLT) in the optical communications network of FIG. 3 configured to reduce a schedule misalignment as reported by an optical network unit(s) (ONU(s)) in the optical communications network.

In one embodiment, each of the ONUs 306(1)-306(N) can provide an indication 338 to indicate the schedule misalignment τ to the OLT 302 for dynamically and adaptively reducing the schedule misalignment τ. In this regard, FIG. 5A is a schematic diagram providing an exemplary illustration of the OLT 302 in FIG. 3 configured to reduce the schedule misalignment τ as reported by any of the ONUs 306(1)-306(N).

The periodic data traffic 301 includes a number of data packets 500. Each of the data packets arrives at the processing circuit 320 and is enqueued in the data buffer 336 at a fixed interval $T_{PKT}$. For example, a first of the data packets 500 (hereinafter referred to as "a selected data packet") is enqueued in the data buffer 336 at time $t_i$, a second of the data packets 500 is enqueued in the data buffer 336 at time $t_{i+1}$ ($t_{i+1}=t_i+T_{PKT}$), a third of the data packets 500 is enqueued in the data buffer 336 at time $t_{i+2}$ ($t_{i+2}=t_{i+1}+T_{PKT}$), and so on.

Each of the scheduled periods 222 in the periodic schedule $S_{Periodic}$ starts at a different scheduled start time $T_{i+x}$ ($x \geq 0$) and lasts for the identical scheduled duration T. For example, a first of the scheduled periods 222 (hereinafter referred to as "a selected scheduled period") starts at the scheduled start time $T_i$, a second of the scheduled periods 222 starts at the scheduled start time $T_{i+1}$ ($T_{i+1}=T_i+T$), a third of the scheduled periods 222 starts at the scheduled start time $T_{i+2}$ ($T_{i+2}=T_{i+1}+T$), and so on. In examples discussed herein, the selected data packet (the first of the data packets 500) is scheduled to be transmitted in the first of the scheduled periods 222, the second of the data packets 500 is scheduled to be transmitted in the second of the scheduled periods 222, the third of the data packets 500 is scheduled to be transmitted in the third of the scheduled periods 222, and so on.

In a non-limiting example, the processing circuit 320 in any of the ONUs 306(1)-306(N) is configured to determine the schedule misalignment τ of the selected data packet by measuring a difference between the time $t_i$, at which the selected data packet is enqueued in the data buffer 336, and the scheduled start time $T_i$ of the selected scheduled period. Accordingly, the processing circuit 320 can determine the schedule misalignment τ to be equal to the time $t_i$ minus the scheduled start time $T_i$ ($\tau = t_i - T_i$). The processing circuit 320 may first empty the data buffer 336 before enqueuing the selected data packet in the data buffer 336. The processing circuit 320 may piggy-back the indication 338 on the uplink communications signal 328U. However, it should be appreciated that the processing circuit 320 can also provide the indication 338 to the OLT 302 via other signals, including a dedicated indication signal, as an example. The ONU interface 322 can subsequently provide the indication 338 to the OLT 302 in a respective one of the uplink optical communications signals 332U(1)-332U(N).

The control circuit 312 receives the indication 338 via the uplink optical communications signal 332U via the OLT interface 314 and sets the temporal step Δt to equal the schedule misalignment τ received in the indication 338. Understandably, the control circuit 312 may also set the temporal step Δt to be slightly different from the schedule misalignment τ to accommodate for jitter in the periodic data traffic 301. Accordingly, the control circuit 312 can adjust the scheduled start time of one or more of the scheduled periods 222 succeeding the selected scheduled period. In the example discussed herein, the first of the scheduled periods 222 is referred to as the selected scheduled period. As such, the control circuit 312 can adjust the scheduled start time $T_{i+1}$ of the second of the scheduled periods 222, the scheduled start time $T_{i+2}$ of the third of the scheduled periods 222, and so on, based on the temporal step Δt. In a non-limiting example, the control circuit 312 can bring forward the scheduled start time $T_{i+1}$ of the second of the scheduled periods 222, the scheduled start time $T_{i+2}$ of the third of the scheduled periods 222, and so on, by the temporal step Δt. As a result, as shown in FIG. 5A, the schedule misalignment τ can be reduced or even eliminated.

Figure 5B:
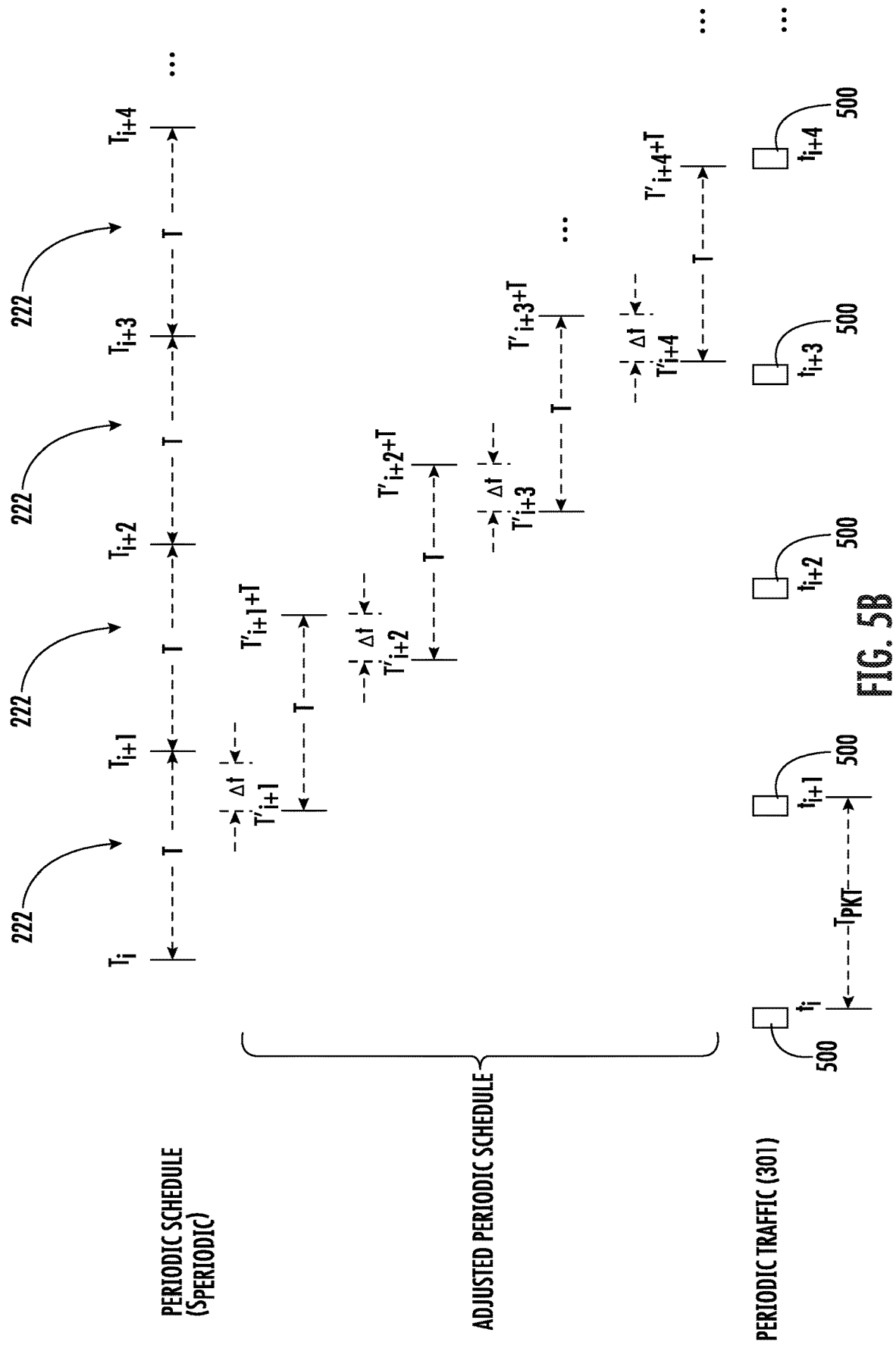
FIG. 5B is a schematic diagram providing an exemplary illustration of an OLT in the optical communications network of FIG. 3 configured to reduce a schedule misalignment independent of the ONU(s) in FIG. 5A.

In an alternative embodiment, the OLT 302 can dynamically and adaptively adjust the periodic schedule $S_{Periodic}$ to reduce the schedule misalignment τ without relying on the indication 338. In this regard, FIG. 5B is a schematic diagram providing an exemplary illustration of the OLT 302 in FIG. 3 configured to reduce the schedule misalignment τ independent of any of the ONUs 306(1)-306(N). Common elements between FIGS. 5A and 5B are shown therein with common element numbers and will not be re-described herein.

With reference to FIG. 5B, the control circuit 312 is configured to estimate the schedule misalignment τ without receiving the indication 338 from any of the ONUs 306(1)-306(N). The control circuit 312 can estimate the schedule misalignment τ based on any suitable methods. In a non-limiting example, the estimated schedule misalignment schedule misalignment τ is less than the scheduled duration T of the scheduled periods 222. The control circuit 312 can then determine the temporal step Δt to be equal to the estimated schedule misalignment τ. Understandably, the control circuit 312 may set the temporal step Δt to be slightly different from the estimated schedule misalignment τ to accommodate jitter in the periodic data traffic 301. Accordingly, the control circuit 312 can adjust the scheduled start time of each of the scheduled periods succeeding the selected scheduled period to equal an end time of an immediately preceding scheduled period plus the scheduled duration and minus the temporal step Δt.

For example, given that the first of the scheduled periods 222 is the selected scheduled period, the control circuit 312 will adjust the scheduled time $T_{i+1}$ of the second of the scheduled periods 222, the scheduled time $T_{i+2}$ of the third of the scheduled periods 222, and so on, based on the temporal step Δt. Specifically, the control circuit 312 will adjust the second of the scheduled periods 222 to start at an adjusted start time $T'_{i+1}$ ($T'_{i+1}=T_{i+1}+T-\Delta t$). Similarly, the control circuit 312 will adjust the third of the scheduled periods 222 to start at an adjusted start time $T'_{i+2}$ ($T'_{i+2}=T_{i+2}+T-\Delta t$), and so on.

Since the control circuit 312 determines the temporal step Δt based on the estimated schedule misalignment τ, it may be possible for the control circuit 312 to over-adjust some of the scheduled periods 222 to cause an over-adjustment situation. For example, the fifth of the scheduled periods 222 has been adjusted to being at an adjusted start time $T'_{i+4}$. However, the fifth of the data packets 500 will not be completely enqueued in the data buffer 336 until time $t_{i+4}$, which is after the fifth of the scheduled periods 222 has ended. As a result, the fifth of the data packets 500 will not be transmitted during the fifth of the scheduled periods 222, thus resulting in the over-adjustment situation.

In a non-limiting example, the control circuit 312 can detect that the over-adjustment situation exists if the OLT 302 fails to receive a data packet in the periodic data traffic 301 during any of the scheduled periods 222 succeeding the selected scheduled period. The control circuit 312 may respond to the over-adjustment situation in a number of ways. In this regard, FIGS. 6A and 6B are schematic diagrams providing exemplary illustrations of how the control circuit 312 can correct the over-adjustment situation in the periodic schedule $S_{Periodic}$.

Figure 6A:
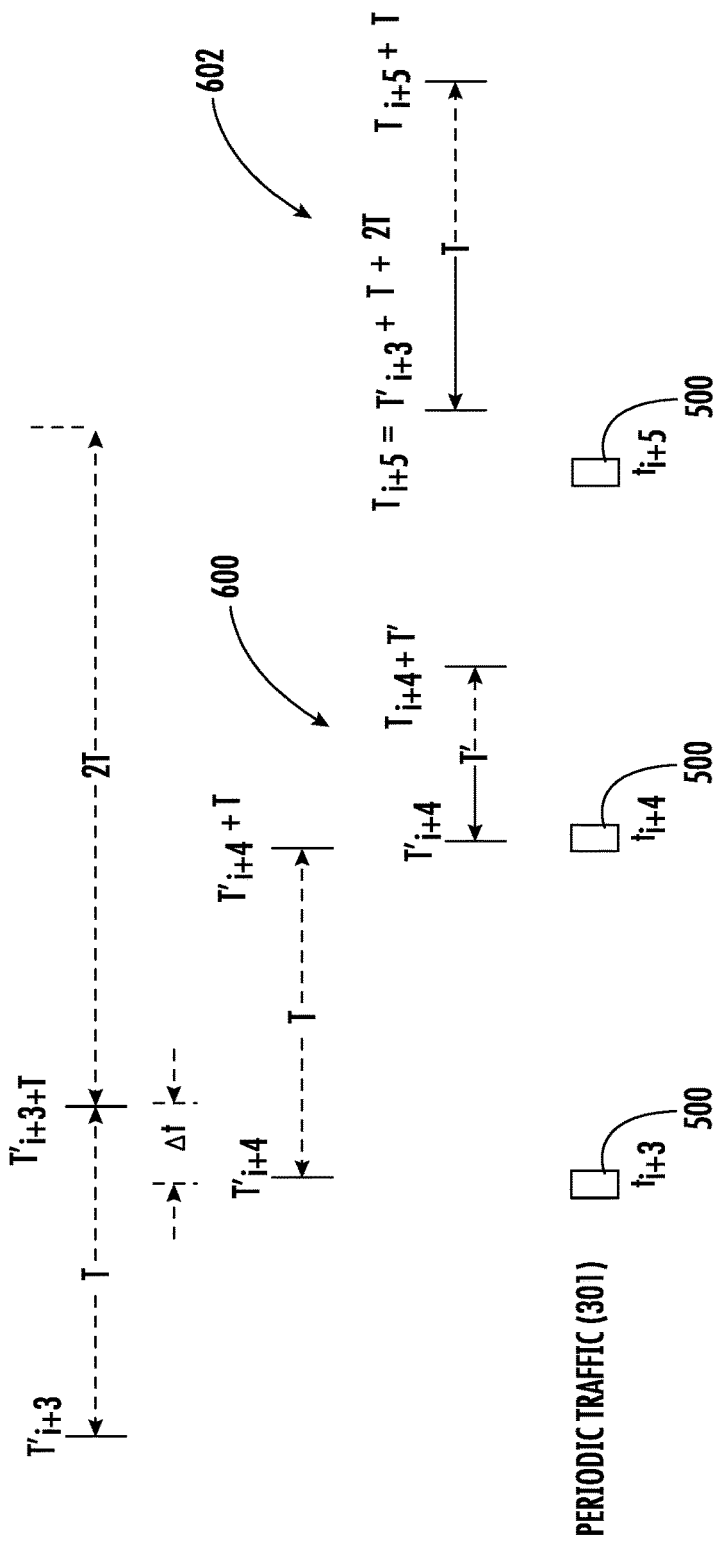
FIGS. 6A and 6B are schematic diagrams providing exemplary illustrations of how to correct an over-adjustment situation while supporting adaptive scheduling for the periodic data traffic.

In one non-limiting example, as illustrated in FIG. 6A, the control circuit 312 can schedule a shortened scheduled period 600 immediately upon detecting the over-adjustment situation to help retrieve the fifth of the data packets 500 in FIG. 5B. The shortened scheduled period 600 begins at an end time of the any of the scheduled periods 222 in which the over-adjustment situation was detected. In the example of FIG. 5B, the over-adjustment situation was detected during the fifth of the scheduled periods 222. As such, the shortened scheduled period 600 should begin at the end time $T'_{i+4}+T$ of the fifth of the scheduled periods 222. The shortened scheduled period 600 can have a shortened scheduled duration T' less than the scheduled duration T.

In addition, the control circuit 312 also schedules an additional scheduled period 602 after scheduling the shortened scheduled period 600. The additional scheduled period 602 begins at two times the scheduled duration T from an end time of a scheduled period immediately preceding the any of the one or more of the plurality of scheduled periods in which the over-adjustment situation was detected. Again, in the example of FIG. 5B, the fourth of the scheduled periods 222, which ends at $T'_{i+3}+T$, was the scheduled period immediately preceding the fifth of the scheduled periods 222 in which the over-adjustment took place. As such, the additional scheduled period 602 should begin at $T'_{i+3}+T+2T$.

Figure 6B:
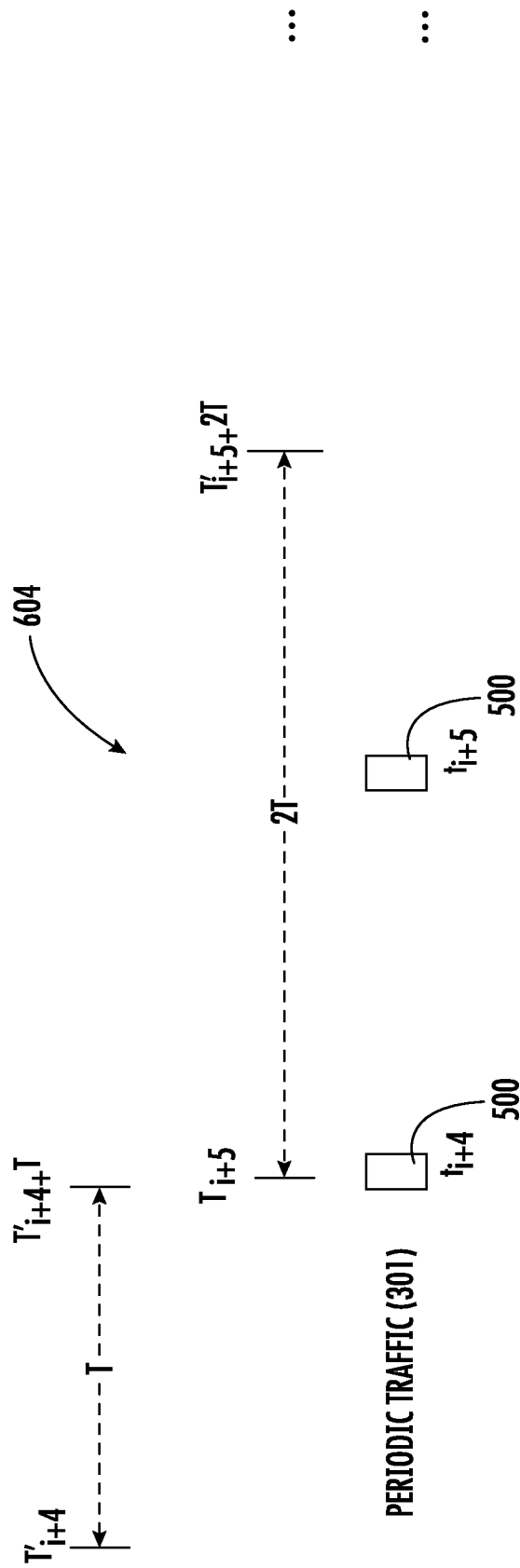

In another non-limiting example, as illustrated in FIG. 6B, the control circuit 312 can schedule a stretched scheduled period 604 immediately upon detecting the over-adjustment situation. The stretched scheduled period 604 begins at the end time of the any of the one or more of the plurality of scheduled periods in which the over-adjustment situation was detected. In the example of FIG. 5B, the over-adjustment situation was detected during the fifth of the scheduled periods 222. As such, the stretched scheduled period 604 should begin at the end time $T'_{i+4}+T$ of the fifth of the scheduled periods 222. The stretched scheduled period 604 can last for twice the scheduled duration T to allow transmission of two data packets 500, including the fifth of the data packets 500 (the missed data packet) and a sixth of the data packets 500 succeeding the fifth of the data packets 500. In addition to reacting to the over-adjustment situation based on the methods described in FIG. 6A or 6B, the control circuit 312 may also reduce the temporal step Δt for subsequent adjustment to the periodic schedule $S_{Periodic}$. In a non-limiting example, the control circuit 312 can also restart adjustment to the periodic schedule $S_{Periodic}$ based on a new temporal step $\Delta t_{new}$ that is smaller than the previous temporal step Δt.

Figure 7:
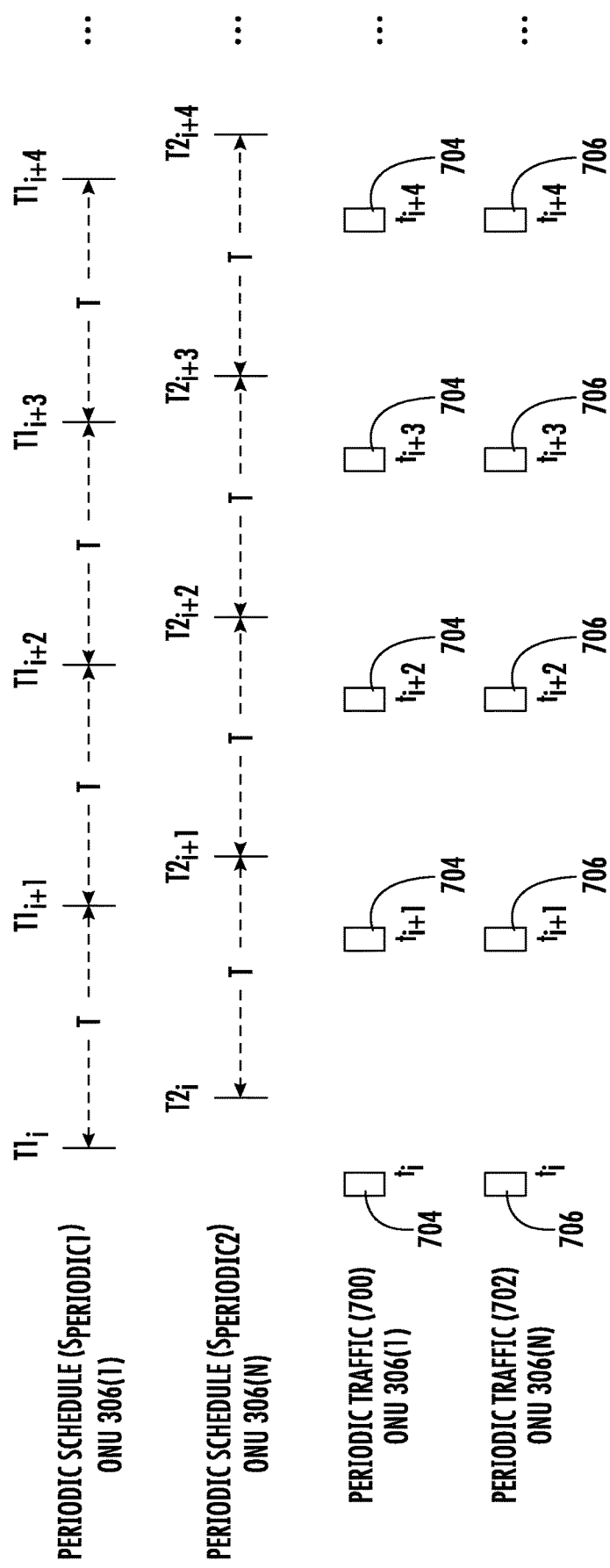
FIG. 7 is a schematic diagram providing an exemplary illustration of how an OLT in the optical communications network of FIG. 3 can support adaptive scheduling for more than one periodic data traffic.

With reference back to FIG. 3, in a non-limiting example, a first of the ONUs 306(1)-306(N) and a second of the ONUs 306(1)-306(N) may both need to transmit the periodic data traffic 301 to the OLT 302 based on a respective periodic schedule $S_{Periodic}$. In this regard, the OLT 302 is configured to ensure that the scheduled start time of each scheduled period associated with the first of the ONUs 306(1)-306(N) (e.g., ONU 306(1)) does not overlap with the scheduled start time of each scheduled period associated with the second of the ONUs 306(1)-306(N) (e.g., ONU 306(N)). In this regard, FIG. 7 is a schematic diagram providing an exemplary illustration of how the OLT 302 in FIG. 3 can support adaptive scheduling for first periodic data traffic 700 and second periodic data traffic 702.

In a non-limiting example, the first periodic data traffic 700 includes a plurality of first data packets 704 and the second periodic data traffic 702 includes a plurality of second data packets 706. As shown in FIG. 7, the first data packets 704 and the second data packets 706 have identical arrival times and identical intervals. In this regard, the control circuit 312 needs to make sure that each scheduled start time $T1_{i+x}$ (x≥0) of a first periodic schedule $S_{Periodic1}$ does overlap with each scheduled start time $T2_{i+x}$ (x≥0) of a second periodic schedule $S_{Periodic2}$. In a non-limiting example, the control circuit 312 can schedule each scheduled start time $T1_{i+x}$ (x≥0) of the first periodic schedule $S_{Periodic1}$ to start earlier than each scheduled start time $T2_{i+x}$ (x≥0) of the second periodic schedule $S_{Periodic2}$. The control circuit 312 may determine which of the first periodic schedule $S_{Periodic1}$ and the second periodic schedule $S_{Periodic2}$ should start earlier based on a variety of parameters, including but not limited to quality-of-service (QoS) requirements, network policies, subscription levels, etc.

Figure 8:
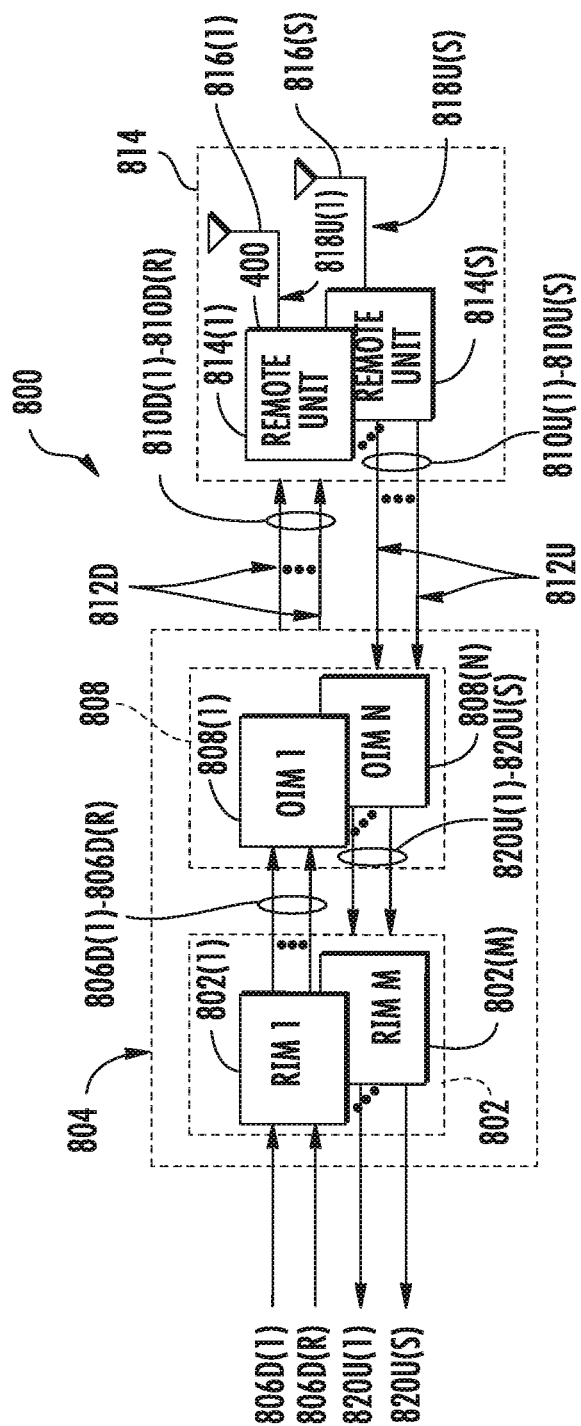
FIG. 8 is a schematic diagram of an exemplary WCS provided in the form of an optical fiber-based DAS that is configured to include the optical communications network of FIG. 3.

FIG. 8 is a schematic diagram of an exemplary WCS 800 provided in the form of an optical fiber-based WCS that can include the optical communications network 300 of FIG. 3 for supporting adaptive scheduling for the periodic data traffic. The WCS 800 includes an optical fiber for distributing communications services for multiple frequency bands. The WCS 800 in this example is comprised of three (3) main components. A plurality of radio interfaces provided in the form of radio interface modules (RIMs) 802(1)-802(M) are provided in a central unit 804 to receive and process a plurality of downlink communications signals 806D(1)-806D(R) prior to optical conversion into downlink optical fiber-based communications signals. In a non-limiting example, the central unit 804 can be configured to include the OLT 302 in the optical communications system 300 of FIG. 3. The downlink communications signals 806D(1)-806D(R) may be received from a base station as an example. The RIMs 802(1)-802(M) provide both downlink and uplink interfaces for signal processing. The notations "1-R" and "1-M" indicate that any number of the referenced component, 1-R and 1-M, respectively, may be provided. The central unit 804 is configured to accept the RIMs 802(1)-802(M) as modular components that can easily be installed and removed or replaced in the central unit 804. In one example, the central unit 804 is configured to support up to twelve (12) RIMs 802(1)-802(12). Each of the RIMs 802(1)-802(M) can be designed to support a particular type of radio source or range of radio sources (i.e., frequencies) to provide flexibility in configuring the central unit 804 and the WCS 800 to support the desired radio sources.

For example, one RIM 802 may be configured to support the Personalized Communications System (PCS) radio band. Another RIM 802 may be configured to support the 800 megahertz (MHz) radio band. In this example, by inclusion of the RIMs 802(1)-802(M), the central unit 804 could be configured to support and distribute communications signals on both PCS and Long-Term Evolution (LTE) 700 radio bands, as an example. The RIMs 802(1)-802(M) may be provided in the central unit 804 that supports any frequency bands desired, including, but not limited to, the US Cellular band, PCS band, Advanced Wireless Service (AWS) band, 700 MHz band, Global System for Mobile Communications (GSM) 900, GSM 1800, and Universal Mobile Telecommunications System (UMTS). The RIMs 802(1)-802(M) may also be provided in the central unit 804 that supports any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 802(1)-802(M) may be provided in the central unit 804 that supports any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the downlink communications signals 806D(1)-806D(R) are provided to a plurality of optical interfaces provided in the form of optical interface modules (OIMs) 808(1)-808(N) in this embodiment to convert the downlink communications signals 806D(1)-806D(R) into a plurality of downlink optical fiber-based communications signals 810D(1)-810D(R). The notation "1-N" indicates that any number of the referenced component 1-N may be provided. The OIMs 808(1)-808(N) may be configured to provide a plurality of optical interface components (OICs) that contain optical-to-electrical (O/E) and electrical-to-optical (E/O) converters, as will be described in more detail below. The OIMs 808(1)-808(N) support the radio bands that can be provided by the RIMs 802(1)-802(M), including the examples previously described above.

The OIMs 808(1)-808(N) each include E/O converters to convert the downlink communications signals 806D(1)-806D(R) into the downlink optical fiber-based communications signals 810D(1)-810D(R). The downlink optical fiber-based communications signals 810D(1)-810D(R) are communicated over a downlink optical fiber-based communications medium 812D to a plurality of remote units 814(1)-814(S). The notation "1-S" indicates that any number of the referenced component 1-S may be provided. In a non-limiting example, each of the ONUs 306(1)-306(N) in the optical communications network 300 of FIG. 3 can be configured to support a respective one or more of the remote units 814(1)-814(S). Remote unit O/E converters provided in the remote units 814(1)-814(S) convert the downlink optical fiber-based communications signals 810D(1)-810D(R) back into the downlink communications signals 806D(1)-806D(R), which are then converted into a plurality of downlink RF communications signals and provided to antennas 816(1)-816(S) in the remote units 814(1)-814(S) to client devices in the reception range of the antennas 816(1)-816(S).

The remote units 814(1)-814(S) receive a plurality of uplink RF communications signals from the client devices through the antennas 816(1)-816(S). The remote units 814(1)-814(S) convert the uplink RF communications signals into a plurality of uplink communications signals 818U(1)-818U(S). Remote unit E/O converters are also provided in the remote units 814(1)-814(S) to convert the uplink communications signals 818U(1)-818U(S) into a plurality of uplink optical fiber-based communications signals 810U(1)-810U(S). The remote units 814(1)-814(S) communicate the uplink optical fiber-based communications signals 810U(1)-810U(S) over an uplink optical fiber-based communications medium 812U to the OIMs 808(1)-808(N) in the central unit 804. The OIMs 808(1)-808(N) include O/E converters that convert the received uplink optical fiber-based communications signals 810U(1)-810U(S) into a plurality of uplink communications signals 820U(1)-820U(S), which are processed by the RIMs 802(1)-802(M) and provided as the uplink communications signals 820U(1)-820U(S). The central unit 804 may provide the uplink communications signals 820U(1)-820U(S) to a base station or other communications system.

Note that the downlink optical fiber-based communications medium 812D and the uplink optical fiber-based communications medium 812U connected to each of the remote units 814(1)-814(S) may be a common optical fiber-based communications medium, wherein for example, wave division multiplexing (WDM) is employed to provide the downlink optical fiber-based communications signals 810D(1)-810D(R) and the uplink optical fiber-based communications signals 810U(1)-810U(S) on the same optical fiber-based communications medium. In a non-limiting example, the OIMs 808(1)-808(N), the downlink optical fiber-based communications medium 812D, and the uplink optical fiber-based communications medium 812U can be configured to collectively form the optical communications network 300 of FIG. 3.

Figure 9:
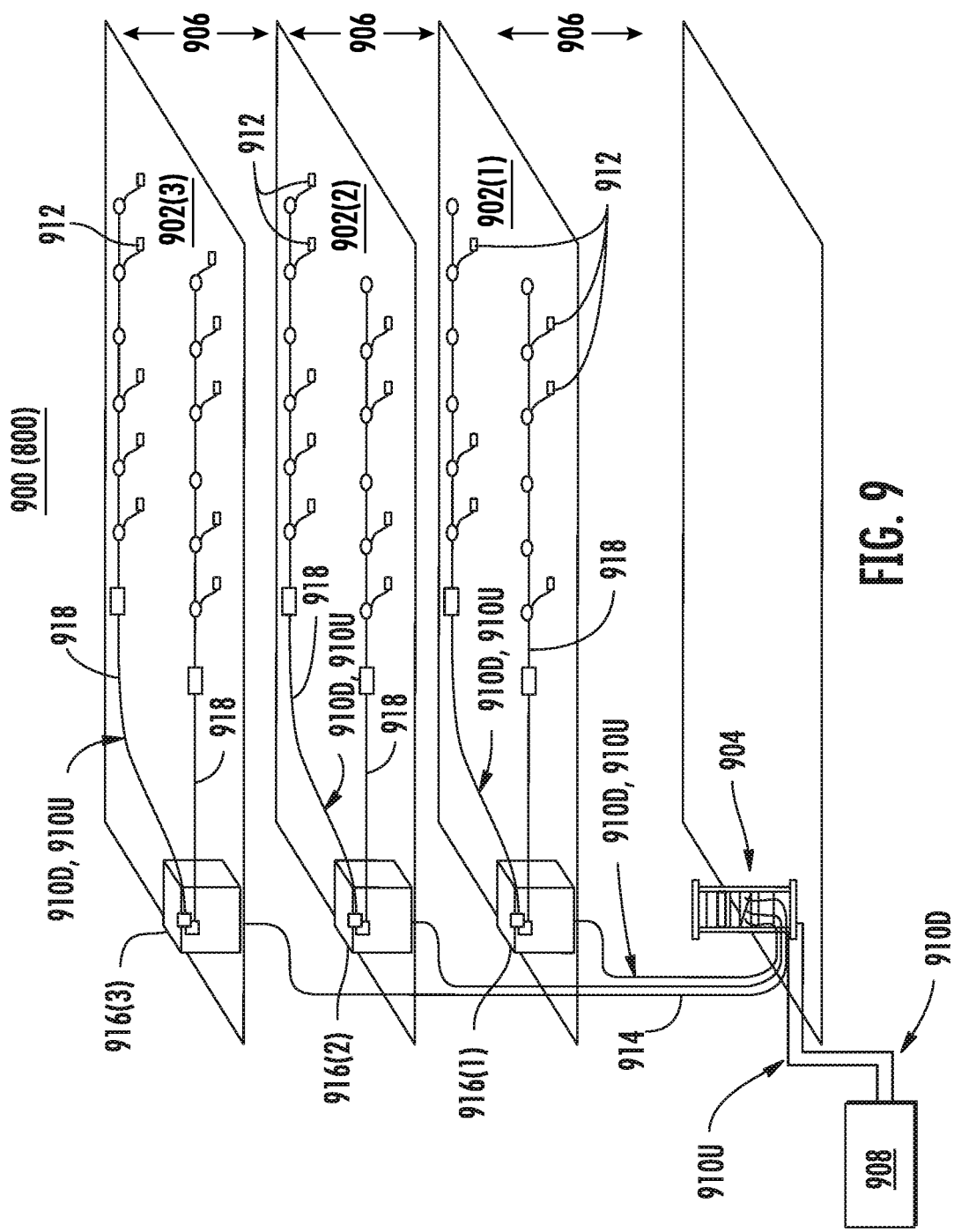
FIG. 9 is a schematic diagram of an exemplary building infrastructure with a deployed DCS, such as the optical fiber-based DAS in FIG. 8.

The WCS 800 in FIG. 8 can be provided in an indoor environment as illustrated in FIG. 9. FIG. 9 is a partial schematic cut-away diagram of an exemplary building infrastructure 900 in which a WCS, such as the WCS 800 of FIG. 8. The building infrastructure 900 in this embodiment includes a first (ground) floor 902(1), a second floor 902(2), and a third floor 902(3). The floors 902(1)-902(3) are serviced by a central unit 904 to provide antenna coverage areas 906 in the building infrastructure 900. The central unit 904 is communicatively coupled to a base station 908 to receive downlink communications signals 910D from the base station 908. The central unit 904 is communicatively coupled to a plurality of remote units 912 to distribute the downlink communications signals 910D to the remote units 912 and to receive uplink communications signals 910U from the remote units 912, as previously discussed above. The downlink communications signals 910D and the uplink communications signals 910U communicated between the central unit 904 and the remote units 912 are carried over a riser cable 914. The riser cable 914 may be routed through interconnect units (ICUs) 916(1)-916(3) dedicated to each of the floors 902(1)-902(3) that route the downlink communications signals 910D and the uplink communications signals 910U to the remote units 912 and also provide power to the remote units 912 via array cables 918.

Figure 10:
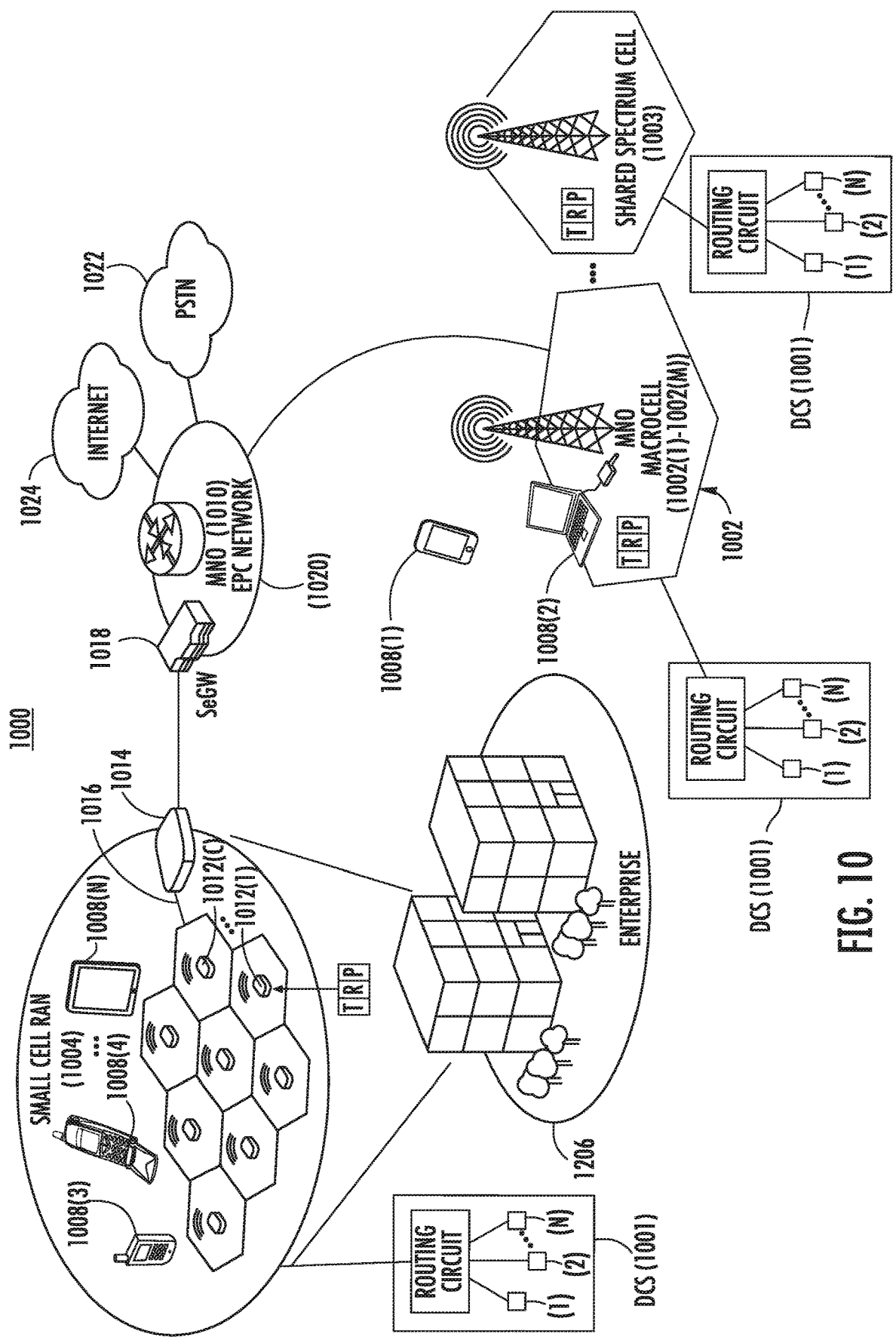
FIG. 10 is a schematic diagram of an exemplary mobile telecommunications environment that includes the WCS of FIG. 8, which includes the optical communications network of FIG. 3 for supporting adaptive scheduling for the periodic data traffic.

The optical communications network 300 of FIG. 3 configured to support adaptive scheduling for periodic data traffic can also be interfaced with different types of radio nodes of service providers and/or supporting service providers, including macrocell systems, small cell systems, and remote radio heads (RRH) systems, as examples. For example, FIG. 10 is a schematic diagram of an exemplary mobile telecommunications environment 1000 (also referred to as "environment 1000") that includes radio nodes and cells that may support shared spectrum, such as unlicensed spectrum, and can be interfaced to shared spectrum DCSs 1001 supporting coordination of distribution of shared spectrum from multiple service providers to remote units to be distributed to subscriber devices. The shared spectrum DCSs 1001 can include the WCS 800 of FIG. 8 as an example.

The environment 1000 includes exemplary macrocell RANs 1002(1)-1002(M) ("macrocells 1002(1)-1002(M)") and an exemplary small cell RAN 1004 located within an enterprise environment 1006 and configured to service mobile communications between user mobile communications devices 1008(1)-1008(N) to a mobile network operator (MNO) 1010. A serving RAN for the user mobile communications devices 1008(1)-1008(N) is a RAN or cell in the RAN in which the user mobile communications devices 1008(1)-1008(N) have an established communications session with the exchange of mobile communications signals for mobile communications. Thus, a serving RAN may also be referred to herein as a serving cell. For example, the user mobile communications devices 1008(3)-1008(N) in FIG. 10 are being serviced by the small cell RAN 1004, whereas user mobile communications devices 1008(1) and 1008(2) are being serviced by the macrocell 1002. The macrocell 1002 is an MNO macrocell in this example. However, a shared spectrum RAN 1003 (also referred to as "shared spectrum cell 1003") includes a macrocell in this example and supports communications on frequencies that are not solely licensed to a particular MNO, such as CBRS for example, and thus may service user mobile communications devices 1008(1)-1008(N) independent of a particular MNO. For example, the shared spectrum cell 1003 may be operated by a third party that is not an MNO and wherein the shared spectrum cell 1003 supports CBRS. Also, as shown in FIG. 10, the MNO macrocell 1002, the shared spectrum cell 1003, and/or the small cell RAN 1004 can interface with a shared spectrum DCS 1001 supporting coordination of distribution of shared spectrum from multiple service providers to remote units to be distributed to subscriber devices. The MNO macrocell 1002, the shared spectrum cell 1003, and the small cell RAN 1004 may be neighboring radio access systems to each other, meaning that some or all can be in proximity to each other such that user mobile communications devices 1008(3)-1008(N) may be able to be in communications range of two or more of the MNO macrocell 1002, the shared spectrum cell 1003, and the small cell RAN 1004 depending on the location of user mobile communications devices 1008(3)-1008(N).

In FIG. 10, the mobile telecommunications environment 1000 in this example is arranged as a Long Term Evolution (LTE) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1000 includes the enterprise environment 1006 in which the small cell RAN 1004 is implemented. The small cell RAN 1004 includes a plurality of small cell radio nodes 1012(1)-1012(C). Each small cell radio node 1012(1)-1012(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 10, the small cell RAN 1004 includes one or more services nodes (represented as a single services node 1014) that manage and control the small cell radio nodes 1012(1)-1012(C). In alternative implementations, the management and control functionality may be incorporated into a radio node, distributed among nodes, or implemented remotely (i.e., using infrastructure external to the small cell RAN 1004). The small cell radio nodes 1012(1)-1012(C) are coupled to the services node 1014 over a direct or local area network (LAN) connection 1016 as an example, typically using secure IPsec tunnels. The small cell radio nodes 1012(1)-1012(C) can include multi-operator radio nodes. The services node 1014 aggregates voice and data traffic from the small cell radio nodes 1012(1)-1012(C) and provides connectivity over an IPsec tunnel to a security gateway (SeGW) 1018 in a network 1020 (e.g., evolved packet core (EPC) network in a 4G network, or 5G Core in a 5G network) of the MNO 1010. The network 1020 is typically configured to communicate with a public switched telephone network (PSTN) 1022 to carry circuit-switched traffic, as well as for communicating with an external packet-switched network such as the Internet 1024.

The environment 1000 also generally includes a node (e.g., eNodeB or gNodeB) base station, or "macrocell" 1002. The radio coverage area of the macrocell 1002 is typically much larger than that of a small cell where the extent of coverage often depends on the base station configuration and surrounding geography. Thus, a given user mobile communications device 1008(3)-1008(N) may achieve connectivity to the network 1020 (e.g, EPC network in a 4G network, or 5G Core in a 5G network) through either a macrocell 1002 or small cell radio node 1012(1)-1012(C) in the small cell RAN 1004 in the environment 1000.

Figure 11:
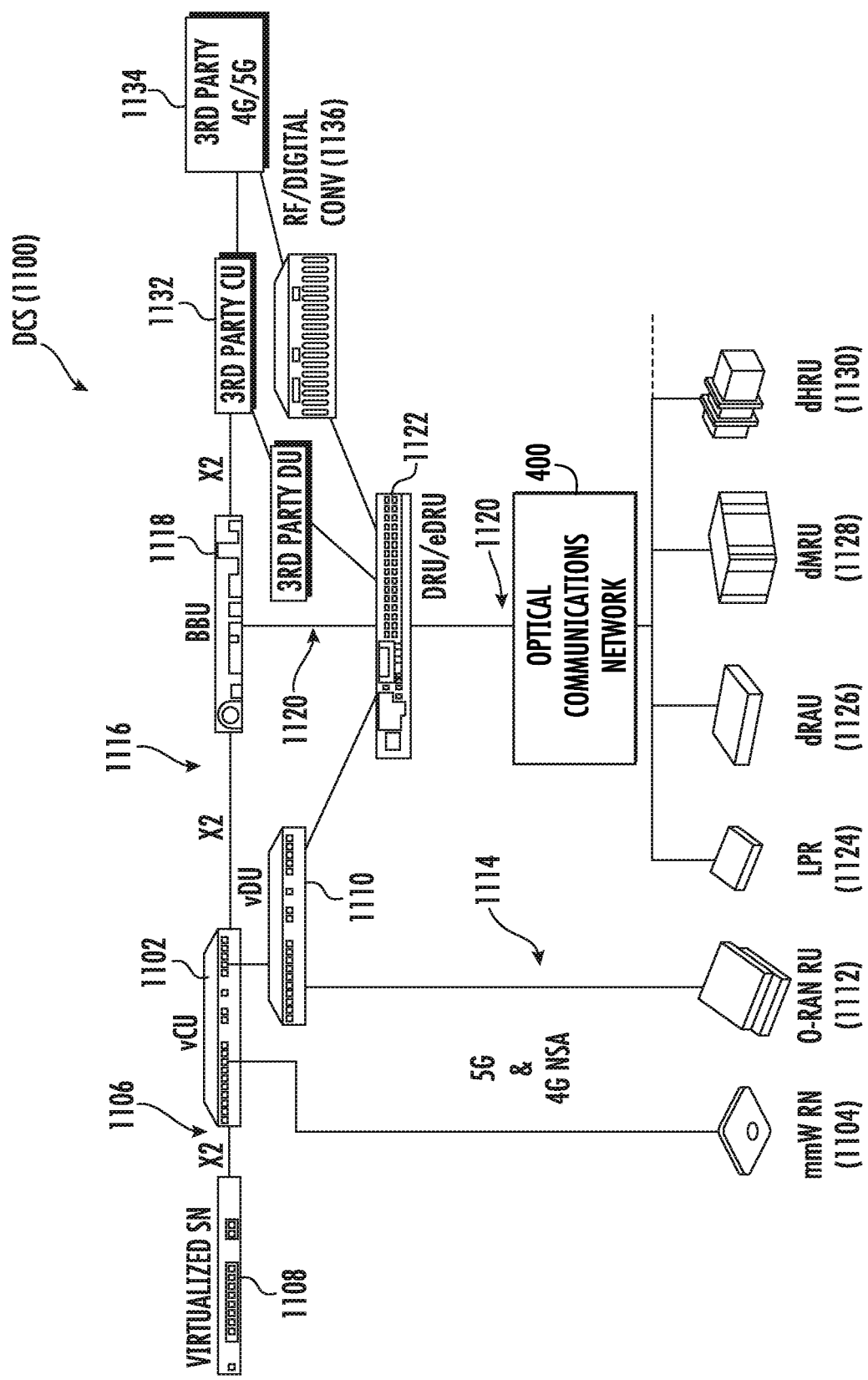
FIG. 11 is a schematic diagram of an exemplary distributed communications system that supports fourth generation (4G) and fifth generation (5G) communications services, and wherein any of the radio nodes can be configured to perform RF-based ranging and imaging in the wireless communications cell.

FIG. 11 is a schematic diagram of another exemplary DCS 1100 that supports 4G and 5G communications services, and wherein any of the radio nodes can be configured to provide feedbackless interference estimation and suppression, according to any of the embodiments herein. The DCS 1100 supports both legacy 4G LTE, 4G/5G non-standalone (NSA), and 5G communications systems. As shown in FIG. 11, a centralized services node 1102 is provided that is configured to interface with a core network to exchange communications data and distribute the communications data as radio signals to remote units. In this example, the centralized services node 1102 is configured to support distributed communications services to a millimeter wave (mmW) radio node 1104. The functions of the centralized services node 1102 can be virtualized through an x2 interface 1106 to another services node 1108. The centralized services node 1102 can also include one or more internal radio nodes that are configured to be interfaced with a distribution node 1110 to distribute communications signals for the radio nodes to an open RAN (O-RAN) remote unit 1112 that is configured to be communicatively coupled through an O-RAN interface 1114.

The centralized services node 1102 can also be interfaced through an x2 interface 1116 to a baseband unit (BBU) 1118 that can provide a digital signal source to the centralized services node 1102. The BBU 1118 is configured to provide a signal source to the centralized services node 1102 to provide radio source signals 1120 to the O-RAN remote unit 1112 as well as to a distributed router unit (DRU) 1122 as part of a digital DAS. The DRU 1122 is configured to split and distribute the radio source signals 1120 to different types of remote units, including a lower power remote unit (LPR) 1124, a radio antenna unit (dRAU) 1126, a mid-power remote unit (dMRU) 1128, and a high power remote unit (dHRU) 1130. The BBU 1118 is also configured to interface with a third party central unit 1132 and/or an analog source 1134 through an RF/digital converter 1136. In a non-limiting example, the DRU 1122 can be coupled to the LPR 1124, the dRAU 1126, the dMRU 1128, and the dHRU 1130 via the optical communications network 300 of FIG. 3, which is configured to support adaptive scheduling for periodic data traffic. In addition, the optical communications network 400 may also be used to enable links between the centralized services node 1102 and the distribution node 1110, between the centralized services node 1102 and the mmW radio node 1104, between the BBU 1118 and the DRU 1122, between the third party central unit 1132 and the DRU 1122, and between the distribution node 1110 and the DRU 1122.

Figure 12:
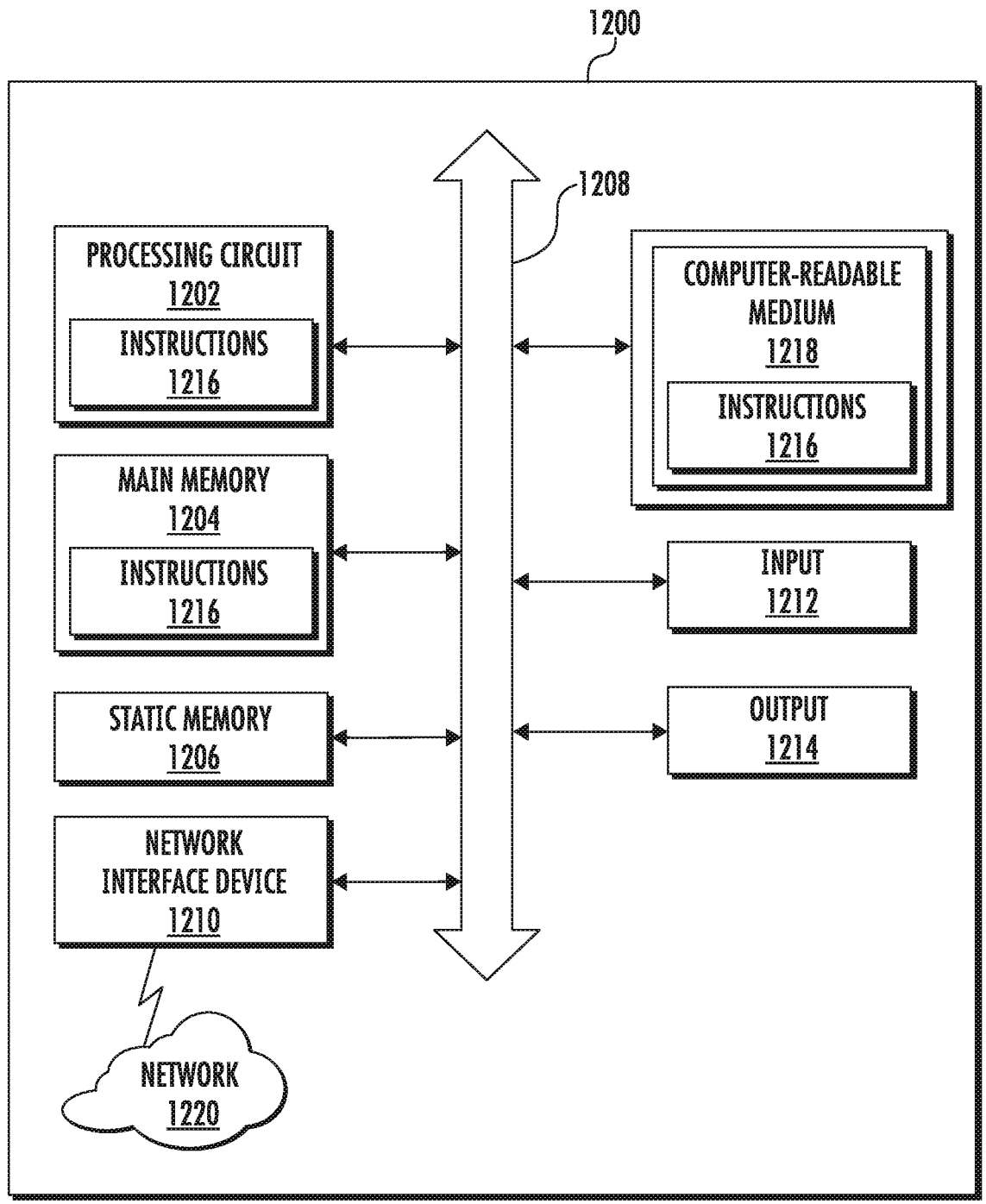
FIG. 12 is a schematic diagram of a representation of an exemplary computer system that can be included in or interface with any of the components in the optical communications network in FIG. 3 for supporting adaptive scheduling for the periodic data traffic, wherein the exemplary computer system is configured to execute instructions from an exemplary computer-readable medium.

Any of the circuits in the optical communications network 300 of FIG. 3 can include a computer system 1200, such as that shown in FIG. 12, to carry out their functions and operations. With reference to FIG. 12, the computer system 1200 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1200 in this embodiment includes a processing circuit or processor 1202, a main memory 1204 (e.g., read-only memory (ROM), flash memory, dynamic random access memory (DRAM) such as synchronous DRAM (SDRAM), etc.), and a static memory 1206 (e.g., flash memory, static random access memory (SRAM), etc.), which may communicate with each other via a data bus 1208. Alternatively, the processing circuit 1202 may be connected to the main memory 1204 and/or static memory 1206 directly or via some other connectivity means. The processing circuit 1202 may be a controller, and the main memory 1204 or static memory 1206 may be any type of memory.

The processing circuit 1202 represents one or more general-purpose processing circuits such as a microprocessor, central processing unit, or the like. More particularly, the processing circuit 1202 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1202 is configured to execute processing logic in instructions 1216 for performing the operations and steps discussed herein.

The computer system 1200 may further include a network interface device 1210. The computer system 1200 also may or may not include an input 1212 to receive input and selections to be communicated to the computer system 1200 when executing instructions. The computer system 1200 also may or may not include an output 1214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processing circuit 1202 during execution thereof by the computer system 1200, the main memory 1204 and the processing circuit 1202 also constituting computer-readable medium. The instructions 1216 may further be transmitted or received over a network 1220 via the network interface device 1210.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

I claim:

1. An optical communications network, comprising:
a plurality of optical network units (ONUs) each configured to communicate periodic data traffic in a plurality of scheduled periods, each of the plurality of scheduled periods beginning at a scheduled start time that is different among the plurality of scheduled periods and lasting for a scheduled duration that is identical among the plurality of scheduled periods; and
an optical line terminator (OLT) comprising:
 a control circuit configured to:
  determine that a schedule misalignment exists in a selected scheduled period among the plurality of scheduled periods associated with any of the plurality of ONUs;
  determine a temporal step based on the determined schedule misalignment; and
  adjust the scheduled start time of one or more of the plurality of scheduled periods succeeding the selected scheduled period based on the temporal step to reduce the schedule misalignment to below a predefined threshold; and
 an OLT interface coupled to the plurality of ONUs and configured to provide the adjusted scheduled start time to the any of the plurality of ONUs, wherein:
 the OLT interface is further configured to receive an indication indicating the schedule misalignment from the any of the plurality of ONUs; and
 the control circuit is further configured to:
  determine the temporal step to be equal to the schedule misalignment; and
  bring forward the scheduled start time of each of the one or more of the plurality of scheduled periods succeeding the selected scheduled period by the temporal step,
 wherein the any of the plurality of ONUs comprises:
  a data buffer configured to queue the periodic data traffic;
  a processing circuit configured to:
   enqueue a selected data packet in the periodic data traffic in the data buffer at a time before the scheduled start time of the selected scheduled period; and
   determine the schedule misalignment that equals the time the selected data packet is enqueued in the data buffer minus the scheduled start time of the selected scheduled period; and
  an ONU interface coupled to the OLT interface and configured to provide the indication comprising the determined schedule misalignment to the OLT.

2. The optical communications network of claim 1, wherein the processing circuit is further configured to empty the data buffer before enqueuing the selected data packet and determining the schedule misalignment.

3. The optical communications network of claim 1, wherein the scheduled start time of each of the plurality of scheduled periods associated with a first of the plurality of ONUs does not overlap with the scheduled start time of each of the plurality of scheduled periods associated with a second of the plurality of ONUs.

4. An optical communications network, comprising:
a plurality of optical network units (ONUs) each configured to communicate periodic data traffic in a plurality of scheduled periods, each of the plurality of scheduled periods beginning at a scheduled start time that is different among the plurality of scheduled periods and lasting for a scheduled duration that is identical among the plurality of scheduled periods; and
an optical line terminator (OLT) comprising:
 a control circuit configured to:
  determine that a schedule misalignment exists in a selected scheduled period among the plurality of scheduled periods associated with any of the plurality of ONUs;
  determine a temporal step based on the determined schedule misalignment;
  adjust the scheduled start time of one or more of the plurality of scheduled periods succeeding the selected scheduled period based on the temporal step to reduce the schedule misalignment to below a predefined threshold; and
 an OLT interface coupled to the plurality of ONUs and configured to provide the adjusted scheduled start time to the any of the plurality of ONUs, wherein the control circuit is further configured to:
estimate the schedule misalignment without receiving an indication from the ONU, wherein the estimated schedule misalignment is less than the scheduled duration of the plurality of scheduled periods associated with the ONU;
determine the temporal step to be equal to the estimated schedule misalignment; and
adjust the scheduled start time of each of the one or more of the plurality of scheduled periods succeeding the selected scheduled period to equal an end time of an immediately preceding scheduled period plus the scheduled duration and minus the temporal step.

5. The optical communications network of claim 4, wherein the control circuit is further configured to detect that an over-adjustment situation exists if the OLT fails to receive a data packet in the periodic data traffic in any of the one or more of the plurality of scheduled periods succeeding the selected scheduled period.

6. The optical communications network of claim 5, wherein, in response to detecting the over-adjustment situation, the control circuit is further configured to:
schedule a shortened scheduled period beginning at an end time of the any of the one or more of the plurality of scheduled periods in which the over-adjustment situation was detected and lasting for a shortened scheduled duration less than the scheduled duration; and
schedule an additional scheduled period to begin at two times the scheduled duration from an end time of a scheduled period immediately preceding the any of the one or more of the plurality of scheduled periods in which the over-adjustment situation was detected.

7. The optical communications network of claim 5, wherein, in response to detecting the over-adjustment situation, the control circuit is further configured to schedule a stretched scheduled period beginning at the end time of the any of the one or more of the plurality of scheduled periods in which the over-adjustment situation was detected and lasting for twice the scheduled duration.

8. The optical communications network of claim 5, wherein the control circuit is further configured to reduce the temporal step in response to detecting the over-adjustment situation.

9. A method for supporting adaptive scheduling for periodic data traffic in an optical communications network for a wireless communications system (WCS), comprising:
communicating the periodic data traffic in a plurality of scheduled periods, each of the plurality of scheduled periods beginning at a scheduled start time that is different among the plurality of scheduled periods and lasting for a scheduled duration that is identical among the plurality of scheduled periods;
determining that a schedule misalignment exists in a selected scheduled period among the plurality of scheduled periods;
determining a temporal step based on the determined schedule misalignment;
adjusting the scheduled start time of one or more of the plurality of scheduled periods succeeding the selected scheduled period based on the temporal step to reduce the schedule misalignment to below a predefined threshold;
receiving an indication indicating the schedule misalignment;
determining the temporal step to be equal to the schedule misalignment;
bringing forward the scheduled start time of each of the one or more of the plurality of scheduled periods succeeding the selected scheduled period by the temporal step;
enqueuing a selected data packet in the periodic data traffic in a data buffer at a time before the scheduled start time of the selected scheduled period;
determining the schedule misalignment that equals the time the selected data packet is enqueued in the data buffer minus the scheduled start time of the selected scheduled period; and
reporting the indication comprising the determined schedule misalignment.

10. The method of claim 9, further comprising emptying the data buffer before enqueuing the selected data packet and determining the schedule misalignment.

11. A method for supporting adaptive scheduling for periodic data traffic in an optical communications network for a wireless communications system (WCS), comprising:
communicating the periodic data traffic in a plurality of scheduled periods, each of the plurality of scheduled periods beginning at a scheduled start time that is different among the plurality of scheduled periods and lasting for a scheduled duration that is identical among the plurality of scheduled periods;
determining that a schedule misalignment exists in a selected scheduled period among the plurality of scheduled periods;
determining a temporal step based on the determined schedule misalignment;
adjusting the scheduled start time of one or more of the plurality of scheduled periods succeeding the selected scheduled period based on the temporal step to reduce the schedule misalignment to below a predefined threshold;
estimating the schedule misalignment without receiving an indication, wherein the estimated schedule misalignment is less than the scheduled duration of the plurality of scheduled periods associated with the ONU;
determining the temporal step to be equal to the estimated schedule misalignment; and
adjusting the scheduled start time of each of the one or more of the plurality of scheduled periods succeeding the selected scheduled period to equal an end time of an immediately preceding scheduled period plus the scheduled duration and minus the temporal step.

12. The method of claim 11, further comprising detecting that an over-adjustment situation exists in response to failing to receive a data packet in the periodic data traffic in any of the one or more of the plurality of scheduled periods succeeding the selected scheduled period.

13. The method of claim 12, further comprising, in response to detecting the over-adjustment situation:
scheduling a shortened scheduled period beginning at an end time of the any of the one or more of the plurality of scheduled periods in which the over-adjustment situation was detected and lasting for a shortened scheduled duration less than the scheduled duration; and
scheduling an additional scheduled period to begin at two times the scheduled duration from an end time of a scheduled period immediately preceding the any of the one or more of the plurality of scheduled periods in which the over-adjustment situation was detected.

14. The method of claim 12, further comprising, in response to detecting the over-adjustment situation, scheduling a stretched scheduled period beginning at the end time of the any of the one or more of the plurality of scheduled periods in which the over-adjustment situation was detected and lasting for twice the scheduled duration.

15. The method of claim 12, further comprising reducing the temporal step in response to detecting the over-adjustment situation.

16. A wireless communications system (WCS) comprising:
an optical communications network, comprising:
a plurality of optical network units (ONUs) each configured to communicate periodic data traffic in a plurality of scheduled periods, each of the plurality of scheduled periods beginning at a scheduled start time that is different among the plurality of scheduled periods and lasting for a scheduled duration that is identical among the plurality of scheduled periods; and
an optical line terminator (OLT) comprising:
a control circuit configured to:
determine that a schedule misalignment exists in a selected scheduled period among the plurality of scheduled periods associated with any of the plurality of ONUs;
determine a temporal step based on the determined schedule misalignment; and
adjust the scheduled start time of one or more of the plurality of scheduled periods succeeding the selected scheduled period based on the temporal step to reduce the schedule misalignment to below a predefined threshold; and
an OLT interface coupled to the plurality of ONUs and configured to provide the adjusted scheduled start time to the any of the plurality of ONUs, wherein
the OLT interface is further configured to receive an indication indicating the schedule misalignment from the any of the plurality of ONUs; and
the control circuit is further configured to:
determine the temporal step to be equal to the schedule misalignment; and
bring forward the scheduled start time of each of the one or more of the plurality of scheduled periods succeeding the selected scheduled period by the temporal step,
wherein any of the plurality of ONUs comprises:
a data buffer configured to queue the periodic data traffic;
a processing circuit configured to:
enqueue a selected data packet in the periodic data traffic in the data buffer at a time before the scheduled start time of the selected scheduled period; and
determine the schedule misalignment that equals the time the selected data packet is enqueued in the data buffer minus the scheduled start time of the selected scheduled period; and
an ONU interface coupled to the OLT interface and configured to provide the indication comprising the determined schedule misalignment to the OLT.

17. The WCS of claim 16, wherein the processing circuit is further configured to empty the data buffer before enqueuing the selected data packet and determining the schedule misalignment.

18. The WCS of claim 16, wherein the scheduled start time of each of the plurality of scheduled periods associated with a first of the plurality of ONUs does not overlap with the scheduled start time of each of the plurality of scheduled periods associated with a second of the plurality of ONUs.

19. The WCS of claim 16, further comprising a central unit comprising the OLT.

20. The WCS of claim 16, wherein the optical communications network is a Passive Optical Network (PON) selected from the group consisting of: Gigabit PON (GPON); and Ethernet PON (EPON).

21. The WCS of claim 20, wherein the optical communications network further comprises a passive optical splitter, the passive optical splitter being coupled to the OLT via a first optical fiber-based communications medium and to the plurality of ONUs via a plurality of second optical fiber-based communications mediums.

22. A wireless communications system (WCS) comprising:
an optical communications network, comprising:
a plurality of optical network units (ONUs) each configured to communicate periodic data traffic in a plurality of scheduled periods, each of the plurality of scheduled periods beginning at a scheduled start time that is different among the plurality of scheduled periods and lasting for a scheduled duration that is identical among the plurality of scheduled periods; and
an optical line terminator (OLT) comprising:
a control circuit configured to:
determine that a schedule misalignment exists in a selected scheduled period among the plurality of scheduled periods associated with any of the plurality of ONUs;
determine a temporal step based on the determined schedule misalignment; and
adjust the scheduled start time of one or more of the plurality of scheduled periods succeeding the selected scheduled period based on the temporal step to reduce the schedule misalignment to below a predefined threshold;
an OLT interface coupled to the plurality of ONUs and configured to provide the adjusted scheduled start time to the any of the plurality of ONUs,
wherein the control circuit is further configured to:
estimate the schedule misalignment without receiving an indication from the ONU, wherein the estimated schedule misalignment is less than the scheduled duration of the plurality of scheduled periods associated with the ONU;
determine the temporal step to be equal to the estimated schedule misalignment; and
adjust the scheduled start time of each of the one or more of the plurality of scheduled periods succeeding the selected scheduled period to equal an end time of an immediately preceding scheduled period plus the scheduled duration and minus the temporal step.

23. The WCS of claim 22, wherein the control circuit is further configured to detect that an over-adjustment situation exists if the OLT fails to receive a data packet in the periodic data traffic in any of the one or more of the plurality of scheduled periods succeeding the selected scheduled period.

24. The WCS of claim 23, wherein, in response to detecting the over-adjustment situation, the control circuit is further configured to:

schedule a shortened scheduled period beginning at an end time of the any of the one or more of the plurality of scheduled periods in which the over-adjustment situation was detected and lasting for a shortened scheduled duration less than the scheduled duration; and schedule an additional scheduled period to begin at two times the scheduled duration from an end time of a scheduled period immediately preceding the any of the one or more of the plurality of scheduled periods in which the over-adjustment situation was detected.

25. The WCS of claim 23, wherein, in response to detecting the over-adjustment situation, the control circuit is further configured to schedule a stretched scheduled period beginning at the end time of the any of the one or more of the plurality of scheduled periods in which the over-adjustment situation was detected and lasting for twice the scheduled duration.

26. The WCS of claim 23, wherein the control circuit is further configured to reduce the temporal step in response to detecting the over-adjustment situation.

* * * * *